US012621166B2

(12) United States Patent
Dietrich et al.

(10) Patent No.: US 12,621,166 B2
(45) Date of Patent: May 5, 2026

(54) CREATION OF A CRYPTOGRAPHICALLY SECURE ELECTRONIC IDENTITY

(71) Applicant: Bundesdruckerei GmbH, Berlin (DE)

(72) Inventors: Frank Dietrich, Berlin (DE); Matthias Schwan, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 236 days.

(21) Appl. No.: 18/556,148

(22) PCT Filed: Apr. 1, 2022

(86) PCT No.: PCT/EP2022/058739
§ 371 (c)(1),
(2) Date: May 21, 2024

(87) PCT Pub. No.: WO2022/223262
PCT Pub. Date: Oct. 27, 2022

(65) Prior Publication Data
US 2025/0097052 A1      Mar. 20, 2025

(30) Foreign Application Priority Data
Apr. 21, 2021    (DE) ..................... 10 2021 110 143.3

(51) Int. Cl.
*H04L 29/06*        (2006.01)
*H04L 9/32*         (2006.01)
*H04L 9/40*         (2022.01)

(52) U.S. Cl.
CPC .......... *H04L 9/3263* (2013.01); *H04L 63/045* (2013.01)

(58) Field of Classification Search
CPC ....... H04L 9/3263; H04L 63/045; H04L 9/14; H04L 9/3247; H04L 63/0478; H04L 63/0823; H04L 63/06
See application file for complete search history.

(56) References Cited

U.S. PATENT DOCUMENTS

| 11,049,395 | B2 * | 6/2021 | Szuprycinski | ........ H04L 9/3268 |
| 2008/0010458 | A1 * | 1/2008 | Holtzman | .......... H04L 63/0823 |
| | | | | 713/189 |

(Continued)

FOREIGN PATENT DOCUMENTS

| DE | 10 2010 030590 A1 | 12/2011 |
| DE | 10 2013 202001 A1 | 8/2014 |

(Continued)

OTHER PUBLICATIONS

International Preliminary Report on Patentability and Written Opinion thereof dated Oct. 24, 2023 for corresponding International Application No. PCT/EP2022/058739.

(Continued)

*Primary Examiner* — Sher A Khan
(74) *Attorney, Agent, or Firm* — Harness, Dickey & Pierce, P.L.C.

(57) ABSTRACT

The method includes performing a remote security inspection of the security infrastructure of a mobile device by a personalization server over a network; receiving a result of the inspection; upon a positive result of the inspection, sending a key generation request of a provisioning component of the ID application program to a security element of the mobile device; in response to the key generation request, generating two asymmetric key pairs assigned to the ID application program by the security element; sending a certificate request by the provisioning component to the personalization server with the public cryptographic keys of the two asymmetric key pairs to the personalization server; receiving a certificate of the ID application program generated by the personalization server with the first public cryptographic key and a root certificate of a root instance of a PKI; and storing the certificate and the root certificate on the mobile device.

19 Claims, 11 Drawing Sheets

(56)         References Cited

U.S. PATENT DOCUMENTS

| | | | | |
|---|---|---|---|---|
| 2012/0036565 | A1* | 2/2012 | Gamez | G06F 21/52 |
| | | | | 726/5 |
| 2019/0036688 | A1 | 1/2019 | Wasily et al. | |
| 2019/0097812 | A1* | 3/2019 | Toth | H04L 9/0841 |
| 2019/0349402 | A1* | 11/2019 | Shukla | H04L 63/0263 |
| 2021/0067338 | A1 | 3/2021 | Yu et al. | |
| 2024/0129139 | A1* | 4/2024 | Dietrich | H04L 9/3231 |

FOREIGN PATENT DOCUMENTS

| | | | | | |
|---|---|---|---|---|---|
| DE | 102016200003 | A1 * | 7/2017 | | G06F 21/33 |
| DE | 102020108828 | A1 * | 9/2021 | | H04L 63/18 |
| EP | 4092958 | B1 * | 7/2024 | | H04L 63/0884 |
| WO | WO-2022175396 | A1 * | 8/2022 | | H04W 12/08 |

OTHER PUBLICATIONS

International Search Report for International Application No. PCT/
EP2022/058739 dated Jul. 15, 2022.

* cited by examiner establish encrypted communication channel    500 establish first encrypted sub-channel    502 read attributes    504 establish second encrypted sub-channel    506 receive attributes    508 store attributes    510

CREATION OF A CRYPTOGRAPHICALLY SECURE ELECTRONIC IDENTITY

CROSS-REFERENCE TO RELATED APPLICATIONS

This application is a national phase under 35 U.S.C. § 371 of PCT International Application No. PCT/EP2022/058739 which has an International filing date of Apr. 1, 2022, which claims priority to German Application No. 10 2021 110 143.3, filed Apr. 21, 2021, the entire contents of each of which are hereby incorporated by reference.

DESCRIPTION

The invention relates to a method for creating a cryptographically secured electronic identity of a user on a mobile device, as well as to a mobile device and a system for executing the method.

Mobile end devices, such as smartphones, are ubiquitous. They are used in many areas of life and situations to perform a wide variety of tasks in the digital domain or with the aid of digital tools. Consequently, corresponding mobile devices must also be able to meet high security requirements. The security of mobile devices, such as smartphones, has therefore become a relevant requirement for the manufacturers of the devices, for the manufacturers of the programs installed on the devices and for providers of services that can be used with the devices. In order to ensure the cryptographic security of such mobile devices, the manufacturers provide these devices with means, such as security elements, for the provision of cryptographic procedures and key material. However, these means are exclusively at the disposal of the device manufacturers. Manufacturers and providers of applications for such mobile devices are therefore faced with the challenge of how they can independently ensure the cryptographic security of the application programs they provide. This challenge arises in particular if a corresponding application program is to manage an electronic identity of a user of the mobile device as an ID application program.

It is therefore an object of the present invention to create an improved method for creating a cryptographically secured electronic identity on a mobile device.

The task underlying the invention is solved in each case with the features of the independent patent claims. Some embodiments of the invention are given in the dependent claims.

Embodiments comprise a method for creating a cryptographically secured electronic identity of a user on a mobile device comprising a security element. An ID application program for providing the electronic identity is installed on the mobile device. The ID application program comprises a control component for controlling the creation of the electronic identity. The ID application program further comprises a provisioning component for executing provisioning of the ID application program in the course of the creation of the cryptographically secured electronic identity.

Provisioning the ID application program comprises:

in response to a security inspection request from the provisioning component, performing a remote security inspection of the security infrastructure of the mobile device using the control component by a personalization server over a network, receiving a result of the remote security inspection of the personalization server, which the control component forwards to the provisioning component, upon a positive result of the remote security inspection, sending a key generation request from the provisioning component to the control component, which the control component forwards to the security element, in response to the key generation request, generating by the security element a first asymmetric key pair associated with the ID application program and a second asymmetric key pair associated with the ID application program, wherein the first asymmetric key pair comprises a first private cryptographic key and a first public cryptographic key, wherein the second asymmetric key pair comprises a second private cryptographic key and a second public cryptographic key, wherein the security element sends the first and second public cryptographic keys to the control component, which forwards the two public cryptographic keys to the provisioning component, upon receipt of the two public cryptographic keys, generating a certificate request by the provisioning component for generating a certificate of the ID application program comprising the first public cryptographic key, wherein the certificate request comprises the first public cryptographic key, sending the certificate request by the provisioning component over the network to the personalization server, the certificate request comprising the first public cryptographic key, wherein the provisioning component sends the second public cryptographic key to the personalization server in addition to the certificate request, in response to the certificate request, receiving the certificate generated by the personalization server with the first public cryptographic key and a root certificate of a root instance of a PKI by the personalization component, storing the certificate of the ID application program and the root certificate on the mobile device.

Some embodiments may have the advantage of enabling the creation of a cryptographically secured electronic identity of a user on a mobile device, more specifically in an ID application program. The mobile device provides a security element for this purpose. Such a security element provides, for example, cryptographic keys and cryptographic algorithms for cryptographically securing the mobile device and the application programs installed on it. Creating the cryptographically secured electronic identity includes, for example, provisioning the ID application program, i.e. providing cryptographic infrastructure, in particular cryptographic keys, which are required for personalization, i.e. introducing the electronic identity into the ID application program. To carry out provisioning, the ID application program comprises a provisioning component. The ID application program also includes a control component. The corresponding control component is configured, for example, to control the setup of the ID application program and its execution.

Some embodiments may have the advantage that in the course of provisioning, an external security inspection of the security infrastructure of the mobile device is first executed. In response to a security inspection request from the provisioning component, a personalization server performs a security inspection of the security infrastructure of the mobile device for the ID application program over a network using the control component. For example, the control component records or queries features of the security infrastructure and sends them to the personalization server, which checks the information provided. The personalization server sends the result of the remote security inspection to the control component, which forwards it to the provisioning component. If the result of the remote security inspection is positive, the provisioning component starts the actual provisioning process. For this purpose, the provisioning component sends a key generation request to the control component, which forwards the key generation request to the security element. In response to the key request, the security element generates two asymmetric key pairs for the ID application program. The first asymmetric key pair of the ID application program comprises a private cryptographic key and a first public cryptographic key. The second asymmetric key pair of the ID application program comprises a second private cryptographic key and a second public cryptographic key of the ID application program. The security element provides the two generated public cryptographic keys in response to the key generation request. These are sent, for example, to the control component, which forwards them to the provisioning component.

Upon receiving the two public cryptographic keys, the provisioning component creates a certificate request to create a certificate of the ID application program comprising the first public cryptographic key. The provisioning component sends this certificate request with the first public cryptographic key to the personalization server via the network. In addition to the certificate request, the provisioning component sends the second public cryptographic key to the personalization server. In response to the certification request, the personalization server creates a certificate with the first public cryptographic key of the ID application program and sends it to the provisioning component. In addition to the generated certificate, the personalization server sends a root certificate of a root instance of a PKI. The received certificate of the ID application program and the root certificate are stored on the mobile device. For example, the provisioning component forwards the root certificate for further use to the control component, which stores the root certificate.

In addition to creating the certificate of the ID application program, the personalization server performs, for example, an attestation information check on the two public cryptographic keys. A key attestation certifies that cryptographic keys, such as public cryptographic keys, have been created in compliance with a predefined set of security requirements and/or that the security element creating the cryptographic keys fulfills the predefined set of security requirements. With the certificate request, for example, attestation information is sent regarding the two public cryptographic keys, which attests to the generation of the two keys by the security element and compliance with predefined security requirements by the security element when generating the corresponding keys. When this attestation information is checked, it is checked whether the personalization server has met predefined requirements when generating the keys. For example, fulfilling the corresponding requirements is a prerequisite for creating the certificate of the ID application program. The generated certificate and the second public cryptographic key are stored on the personalization server, for example.

The first asymmetric key pair, which the security element is provided with and for which a certificate has been issued by the personalization server, enables the ID application program to authenticate itself to other instances. The certificate proves the authenticity of the first public cryptographic key. This first public cryptographic key can, for example, be used as a signature verification key for signatures that were created with the first private cryptographic key. Thus, an entity that has the certificate with the first public cryptographic key can verify signatures that the security element has created with the first private cryptographic key as a signature key for the ID application program.

The second asymmetric key pair, whose second public cryptographic key is available to the personalization server, enables authentication of the ID application program to the personalization server. Using the public cryptographic key as a signature verification key, the personalization server can verify signatures created by the security element with the second private cryptographic key for the ID application program. Furthermore, the second public cryptographic key can be used by the personalization server, for example, to calculate a symmetric cryptographic session key for encrypting a communication between the personalization server and the ID application program. For example, a Diffie-Hellmann method can be used to calculate the symmetric cryptographic key.

A mobile device, such as a smartphone, with an ID application program that provides an electronic identity of the user of the mobile device can, for example, serve as proof of identity, authentication, and authorization tokens in electronic business processes. The user of the mobile device is securely authenticated, for example, by the service they intend to use. For example, attributes of the electronic identity are read for authentication by an ID provider server of an ID provider service, which provides the corresponding service with the corresponding attributes for authenticating the user. For example, a device manufacturer offers procedures on the mobile device it manufactures that enable secure user authentication, e.g., using biometric features. Application manufacturers can use this functionality as well as other functions of a security element provided by the respective device manufacturer on the mobile device, for example a hardware-based security element, a so-called KeyStore, for handling cryptographic key material. This makes it possible to establish a secure bond between the user and the mobile device. An electronic identity of the user bound to the mobile device is created and personalized. The electronic identity created in this way is provided to the user for use by the ID application program.

To create a cryptographically secured electronic identity of the user of the mobile device, the mobile device is provisioned for the purpose of binding the user to the corresponding device and an ID application program installed on the mobile device for using the electronic identity. In the course of personalizing the electronic identity on the mobile device, the corresponding identity of the user is derived from an existing electronic identity, which is provided by means of an ID token. The electronic identity personalized in this way is used under the control of the previously bound user.

To provide the device-specific security element, cryptographic key material, such as an asymmetric key pair, is generated in the device-specific security element with a connection to a PIN, in particular a system PIN, and/or biometric characteristics of the user of the mobile device. A system PIN is, for example, a PIN of the user assigned to the operating system of the corresponding mobile device. Furthermore, a certificate for the key material generated in the device-specific security element is requested from a provisioning service, which is provided by a personalization server via a network. To personalize the ID application program, a connection secured by mutual authentication, or a secure transmission channel is established from the mobile device to a personalization service provided by a personalization server via a network. User-side authentication includes, for example, capturing biometric characteristics of the user and/or entering a PIN, in particular a system PIN, of the mobile device by the user. Furthermore, an electronic identity document or ID token of the user is read by the personalization server via the mobile device. This is done in conjunction with user authentication against the electronic identity document, such as the user entering a document PIN. Information or attributes required for personalization are transmitted from the electronic identity document to the personalization server via the previously established secure transmission channel. Furthermore, an end-to-end encrypted channel is established between the ID application program on the mobile device and the personalization server using the established communication channel. In the course of this setup, the ID application program authenticates to the personalization server and the personalization server authenticates to the ID application program. Finally, the ID application program installed on the mobile device is personalized by the personalization server with the user's data read from the electronic identity document and the necessary cryptographic keys.

The electronic identity created on the mobile device and derived from the ID token is used by means of the device-specific security element to provide identity information or attributes of the user. The attributes are provided to a requesting ID provider server, for example. A corresponding provision comprises a user authentication towards the ID application program, an authentication of the ID provider server by the ID application program and an authentication of the ID application program to the ID provider server, as well as a transfer of the attributes to the ID provider server.

The method for provisioning the ID application program installed on a mobile device with the cryptographic keys prepares the mobile device, for example, for subsequent cryptographically secured personalization with identity information or attributes of the user of the mobile device and its binding to the mobile device. This can be done without the need for external access to the security element of the mobile device and thus, for example, independently of the device manufacturer. It is not necessary to insert external key material or software into the security element. A mobile device provided with a corresponding electronic identity managed by the ID application program enables identification and/or authentication of the user of the mobile device. This enables authentication of the user to the ID application program, which is independent of the device manufacturer, using the security element dependent on the device manufacturer. The user authenticates himself to this security element, which confirms successful user authentication to the ID application program, for example the control component included in the ID application program.

By provisioning and personalizing the ID application program installed on the mobile device, a derived electronic identity bound to the user of the mobile device is created and made available for use by the ID application program. The ID application program, which is independent of the device manufacturer, enables identification and/or authentication of the user of the mobile device with the electronic identity managed by the ID application program. This enables authentication of the user to the ID application program, which is independent of the device manufacturer, using a security element of the mobile device that is dependent on the device manufacturer. The user authenticates himself to this security element, which is, for example, a prerequisite for using the attributes of the electronic identity by the ID application program. Successful user authentication by the security element is confirmed to the ID application program by the security element. For example, use of the attributes requires the execution of cryptographic operations, such as the generation of a secret using a cryptographic key, which are assigned to the ID application program and stored on the security element. Use of the corresponding cryptographic key in turn requires successful user authentication. Providing the result of the corresponding cryptographic operations, such as the secret, by the security element to the ID application program thus at least implicitly confirms that a successful user authentication has been performed by the security element.

A security element is understood to be a secured element of a mobile device that provides cryptographic means. These cryptographic means are protected against manipulation and are only for example accessible to authorized services and applications via cryptographic keys. In particular, the cryptographic means can, for example, only be introduced into the security element, added to, changed and/or deleted by authorized services and applications. A security element thus provides a tamper-proof platform, for example implemented in the form of a secure single-chip microcontroller, on which software and/or confidential and/or cryptographic data can be stored in accordance with predefined rules and security requirements by reliably identified trustworthy instances and thus made available to authorized application programs and/or operating systems. A security element is, for example, embedded in the mobile device as a hardware component, i.e., it cannot be detached in a non-destructive manner. A security element can, for example, be implemented in the form of a secure element (SE). The security element can, for example, be implemented as a cryptographically secured co-processor, i.e., a secure enclave, with a hardware-based key manager, which enables and provides an additional level of security by isolating it from a main processor of the mobile device. This co-processor can be used to generate symmetric cryptographic keys and/or asymmetric crypto-graphic key pairs. For example, the co-processor provides identifiers that can be used to identify the cryptographic keys. Using the identifiers, the secure enclave can be requested to perform cryptographic operations, such as encryption and/or decryption, on behalf of another program, such as a key management program. For example, using cryptographic keys provided by the co-processor, elements to be stored can be encrypted and stored on the mobile device. For example, the derived or generated cryptographic keys are stored on a security element, i.e., the security element comprises a data vault for cryptographic keys or a "key store". Such a key store or security element can also be implemented as part of the main processor, for example in a TEE (Trusted Execution Environment). For example, the security element can be implemented using or as a TEE. A TEE provides a secure or trusted runtime environment for applications. Such a TEE can, for example, exist in isolation on a separate processor, i.e., a co-processor, directly on the main processor(s) of the mobile device or in a die of a multiprocessor system or a single-chip system (SoC). For example, only specially unlocked applications can be executed on such a TEE.

An application program, also known as an application or app for short, refers to a computer program that provides, supports and/or enables the processing of non-system functionality.

An operating system refers to a computer program or a compilation of computer programs that provide, support and/or enable the processing of system-related functionalities. System resources are made available by an operating system. System resources refer to system elements or hardware components of a computer that are required by processes for correct execution.

A computer or computer system may be, for example, a stationary computer, such as a personal computer (PC), service terminal or server, or a mobile portable computer, such as a laptop, tablet, smartphone, or other smart device. The computer may comprise an interface for connecting to the network, whereby the network may be a private or public network, in particular the Internet. In some embodiments, this connection may also be established via a mobile network.

A "service provider server" or service server is understood here as a server or a computer system on which a server program is executed, and which provides the possibility of initiating or making use of and/or executing an offered service via a network.

A "personalization server" is understood here as a server or a computer system on which a server program is executed, and which is configured to read attributes from an ID token and insert them into a mobile device.

An "ID token" is understood here as a portable electronic device, for example a so-called USB stick, a chip card, or a document on which attributes of a user are stored. In particular, a "document" is understood to be an identification, value or security document, in particular a sovereign document, in particular a paper-based and/or plastic-based document, such as an electronic identification document, in particular a passport, identity card, visa, driving license, vehicle registration document, vehicle registration document, health card, or a company ID card, or another ID document, a chip card, means of payment, in particular a banknote, bank card or credit card, consignment note or other proof of authorization. In particular, the ID token can be a machine-readable travel document, such as those standardized by the International Civil Aviation Organization (ICAO) and/or the German Federal Office for Information Security (BSI).

A "personalization server" is understood as a server or a computer system on which a server program is executed, and which is configured to read attributes from an ID token and insert them into a mobile device. Furthermore, the personalization server is configured, for example, to provision the mobile device, in particular with cryptographic keys.

An "ID provider server" is understood as a server or a computer system on which a server program is executed, and which is configured to provide attributes of an electronic identity provided by the mobile device for a service provider server and/or to confirm them to the service provider server.

A "mobile portable device" is understood as a mobile portable communication device, such as a smartphone, a tablet, or a smartwatch.

A "program" or "program instructions" is understood here as meaning, without limitation, any type of computer program that comprises machine-readable instructions for controlling a functionality of the computer.

A "processor" is understood here as a logic circuit that is used to execute program instructions. The logic circuit can be implemented on one or more discrete components, in particular on a chip. In particular, a "processor" is understood to mean a microprocessor or a microprocessor system comprising several processor cores and/or several microprocessors.

A "memory" is understood here as both volatile and non-volatile electronic memories or digital storage media.

A "non-volatile memory" is understood here as an electronic memory for the permanent storage of data, in particular of static cryptographic keys, attributes or identifiers. A non-volatile memory can be configured as a non-changeable memory, which is also referred to as read-only memory (ROM), or as a changeable memory, which is also referred to as non-volatile memory (NVM). In particular, this can be an EEPROM, for example a flash EEPROM, referred to as flash for short. A non-volatile memory is characterized by the fact that the data stored on it is retained even after the power supply is switched off.

An "interface" or "communication interface" is understood here as an interface via which data can be received and transmitted, whereby the communication interface can be configured with or without contact. A communication interface can, for example, enable communication via a network. Depending on the configuration, a communication interface can, for example, provide wireless communication in accordance with a mobile radio standard, Bluetooth, RFID, Wi-Fi and/or NFC standard. Depending on the configuration, a communication interface can, for example, provide cable-based communication. The communication interface can be an internal interface or an external interface.

The encrypted communication channels are, for example, encrypted end-to-end connections. An "encrypted end-to-end connection" or an "encrypted end-to-end transmission channel" is understood here as a connection between a sender and a receiver with end-to-end encryption, in which the data to be transmitted is encrypted by the sender and only decrypted again by the receiver. The encryption of transmitted data thus takes place across all transmission stations so that intermediate stations cannot gain knowledge of the content of the transmitted data due to the encryption. The connection is cryptographically secured by the encryption in order to prevent spying and/or manipulation of the transmission, whereby a so-called secure messaging method can be used for this purpose. End-to-end encryption is based, for example, on two symmetric cryptographic keys, whereby a first of the symmetric keys is used for encrypting messages and a second of the symmetric keys is used for authenticating the sender of the message, for example by means of Message Authentication Code (MAC) algorithms. For example, ephemeral keys for encryption are negotiated for an encrypted communication channel in the course of setting it up, which lose their validity when the communication channel is terminated. The use of different ephemeral keys for different communication channels makes it possible to operate a number of communication channels in parallel.

For example, an encrypted communication channel can be set up using the Transport Layer Security (TLS) protocol, for example as part of the Hypertext Transfer Protocol Secure (HTTPS) protocol.

Asymmetric key pairs are used for a variety of cryptosystems and play an important role in the secure transmission of electronic data. An asymmetric key pair consists of a public cryptographic key, which is used to encrypt and/or decrypt data and may be passed on to third parties, for example to a sender or recipient of data, and a private cryptographic key, which is used to encrypt and/or decrypt but also to sign data and must generally be kept secret. The public key enables anyone to encrypt data for the holder of the private cryptographic key or to verify digital signatures created with the private cryptographic key. A private key enables its holder to decrypt data encrypted with the public cryptographic key or to create digital signatures of data.

A digital signature of data comprises, for example, forming a check value of the data, such as a hash value, which is encrypted with a private cryptographic key of an asymmetric key pair used as a signature key. In the case of a signature, only the signatory knows the private cryptographic key used to create the signature, i.e., the signature key of the asymmetric key pair used for the signature. The signature recipient only has the public cryptographic key, i.e., the signature verification key, of the asymmetric key pair used for the signature. The signature recipient can therefore verify the signature but cannot calculate it itself. For a signature check, for example, the signature recipient calculates the check value of the signed data and compares this with the result of decrypting the signature using the signature check key. If the calculated hash value matches the result of the decryption, the signature is correct. If the authenticity of the signature verification key is also confirmed, for example by a certificate, in particular a PKI certificate, the signature is valid.

A "certificate" is understood here as a digital certificate, which is also referred to as a public key certificate (PKI certificate). A certificate is structured data that is used to assign a public cryptographic key of an asymmetric cryptosystem to an identity, such as a person, institution, or device. For cryptographic security and to prove the authenticity of the certificate data, these are signed by a certificate issuer. A so-called Public Key Infrastructure (PKI) is realized by PKI certificates, which are based on asymmetric key pairs and, with the exception of a root certificate, are each signed by a certificate issuer with a signature key whose associated signature verification key is assigned to the certificate issuer by a PKI certificate of the corresponding certificate issuer. For example, the certificate can correspond to the X.509 standard or another standard. For example, the certificate is a Card Verifiable Certificate (CVC). An authorization certificate comprises structured data that additionally defines the rights of the identity.

The PKI provides a system for issuing, distributing, and verifying digital certificates. In an asymmetric cryptosystem, a digital certificate can confirm the authenticity of a public cryptographic key and its permissible scope of application and validity. The digital certificate itself is protected by a digital signature, the authenticity of which can be verified using the public cryptographic key of the issuer of the certificate. A digital certificate is used to check the authenticity of the issuer's key. In this way, a chain of digital certificates can be built up, each of which confirms the authenticity of the public cryptographic key with which the previous certificate can be checked. Such a chain of certificates forms a so-called validation path or certification path. The participants in the PKI must be able to rely on the authenticity of the last certificate, the so-called root certificate, and the key certified by it, for example, without another certificate. The root certificate is managed by a so-called root certification authority, the authenticity of all certificates of the PKI is based on its assumed authenticity.

Digital certificates are confirmed, for example, by an independent, credible authority (certification service provider/ZDA or trust service provider/VDA), i.e., the certification authority issuing the certificate. Certificates can be made available to a wide range of people to enable them to check the authenticity and validity of electronic signatures. A certificate can be assigned to an electronic signature and provide a signature verification key in the form of the public cryptographic key if the private key associated with the signature verification key was used as the signature key. By making a certificate in association with a public cryptographic key available to the general public, a CSP/VSP enables users of asymmetric cryptosystems to assign the public cryptographic key to an identity, for example a person, an organization, or a computer system.

Authentication refers to the verification of a claimed identity of an entity, such as a user of the mobile device. In the course of authentication, for example, a corresponding proof provided by the user is verified. The entity performs authenticating by contributing to the authentication, i.e., by providing corresponding evidence such as authentication data or authentication factors for verification.

Authenticating the user with respect to the claimed property of authenticity, for example the authenticity of his person or identity, allows the authenticated user to perform further actions. For example, the user is granted access rights. A successfully authenticated user is considered authentic. A final confirmation of an authentication can include an authorization.

The user can authenticate himself in various ways. For example, he can provide proof of knowledge, such as a PIN or a password, proof of possession, such as a cryptographic key, a certificate, or an electronic device, and/or proof of characteristics of his person itself, such as biometric features or behavioral characteristics. For example, the corresponding proof is recorded by an authentication sensor of the mobile end device in the form of authentication data of the user and compared by a security element of the mobile end device with one or more stored reference values. The security element evaluating the recorded authentication data is, for example, a security element of the operating system of the mobile device. If there is a sufficient match between the captured authentication data and the stored reference values, the security element confirms that the user has been successfully authenticated. For example, confirmation of successful authentication of the user includes execution of a challenge-response procedure by the confirming security element. For example, in response to a successful authentication of the user, the confirming security element confirms this successful authentication to the ID application program installed on the mobile device, for example to the control component of the ID application program, by means of a correct response to a challenge of the installed ID application program.

An authentication sensor is understood to be a sensor for capturing authentication data of the user of the mobile device. The authentication data may include, for example, biometric data of the user. The authentication sensor can be configured to capture biometric data of the user. Biometric data can include, for example: Fingerprint data, body geometry data/anthropometry data, such as face, hand, ear geometry data, palm line structure data, vein structure data, such as hand vein structure data, iris data, retina data, voice recognition data, nail bed pattern. The authentication sensor can, for example, comprise a camera of the mobile end device. The authentication data can include, for example, knowledge of the user, such as a PIN or password. The authentication sensor may comprise an input device for entering authentication data, such as a PIN or a password. The input device may comprise, for example, a keyboard and/or a touch screen.

A challenge-response method represents a secure authentication procedure of a first instance towards a second instance based on knowledge. For example, an authenticating security element of a mobile device, such as a security element of the operating system of the mobile device, is authenticated by another authenticating security element of the mobile device using a challenge-response method. At the same time, the response represents a confirmation of successful user authentication if the response is only generated under the condition of successful user authentication by the authenticating security element. Thus, in the event of a successful challenge-response procedure, the authenticating security element not only knows that the user authentication has been confirmed, but also that it has been confirmed by the authenticating security element and is therefore valid.

In the course of a challenge-response procedure, a first instance issues a task ("challenge") to a second instance, for which the second instance must provide a correct answer ("response").

For example, the first instance generates a random value ("nonce") and sends this to the second instance. The second instance uses, for example, a shared secret for a cryptographic transformation of the nonce and sends the result to the first instance as a response for the purpose of authenticating the second instance. For example, the nonce is combined with the shared secret and a cryptographic hash function or an encryption is applied to this combination. Alternatively, the shared secret, such as a symmetric cryptographic key, can be used to encrypt the nonce. The first instance, which knows both the nonce and the shared secret, can, for example, perform the same calculation as the second instance and/or perform an inverse calculation, e.g., decrypt the encrypted nonce again using the shared secret. If the result of the calculation by the first instance matches the result of the calculation of the second instance or the challenge, the challenge-response procedure is successful, and the second instance is successfully authenticated.

Furthermore, a challenge-response procedure can also be based on an asymmetric cryptosystem and serve to prove that the second instance possesses a private and thus secret cryptographic key with respect to the first instance. Only the second instance knows the corresponding private cryptographic key, which it uses for a cryptographic transformation of the challenge, e.g. a nonce. The corresponding cryptographic transformation can be a digital signature, for example. Using a public cryptographic key associated with the private cryptographic key, the first instance can check on the basis of the response whether the second instance actually has knowledge of the private cryptographic key, without the first instance itself gaining knowledge of the private cryptographic key in the course of the check.

In some embodiments, the personalization component forwards the root certificate to the control component for storage.

Some embodiments may have the advantage that the root certificate is available to the control component, which may use the root certificate to verify certificate chains. For example, if the control component receives a certificate chain from an external instance or an external server, it can verify the signature of the root instance on which the certificate chain depends using the root certificate.

In some embodiments, the mobile device further comprises one or more authenticating sensors for detecting one or more authenticating factors of the user. The user is registered on the mobile device and one or more reference values of the registered user are stored in the security element for verifying at least one captured authentication factor of the registered user. The security element is configured such that a prerequisite for generating the first asymmetric key pair is successful authentication of the user to the security element. With the authentication, the user declares consent to the generation of the first asymmetric key pair. The security element is also configured such that a prerequisite for the use of the first private cryptographic key by the security element is a further successful authentication of the user to the security element. With each further authentication, the user declares consent to the corresponding use of the first private cryptographic key.

Some embodiments may have the advantage that both the generation of the first asymmetric key pair and the use of the first private cryptographic key can be bound to the user of the mobile device. This also binds the ID application program to the user of the mobile device, since cryptographically secured use of the ID application program or an electronic identity managed by it, i.e. use of the first asymmetric key pair, is only possible on condition of successful user authentication to the mobile device or the security element of the mobile device. Thus, it can be ensured that the user is prompted to authenticate each time the ID application program is used, which includes use of the first private cryptographic key of the ID application program and declares consent to the use of the first private cryptographic key with a corresponding authentication.

In some embodiments, the security element is a device-specific security element. A device-specific security element is understood here to be a security element to which no device-independent or device manufacturer-independent external access is possible. For example, the security element is set up in such a way that the personalization server cannot access the security element and introduce external key material or software. Thus, it is not possible for the personalization server to introduce external cryptographic key material or software, such as cryptographic functions, in the course of personalization. Some embodiments may have the advantage of enabling provisioning even if the security element is a device-specific security element.

In some embodiments, the method further comprises personalizing the ID application program on the mobile device using an ID token. The ID application program further comprises a personalization component for personalizing the ID application program. The personalization comprises:

establishing a first encrypted communication channel between the mobile device and the personalization server over the network, wherein the personalization component is used to establish the first encrypted communication channel, establishing a first encrypted sub-channel between the ID token and the personalization server within the first encrypted communication channel via the mobile device, wherein the personalization component is used to establish the first encrypted sub-channel, reading one or more of the attributes from the ID token by the personalization server via the first encrypted sub-channel within the first encrypted communication channel, establishing a second encrypted sub-channel between the control component and the personalization server within the first encrypted communication channel, the personalization component being used to establish the second encrypted sub-channel, receiving the read attributes by the control component from the personalization server via the second encrypted sub-channel within the first encrypted communication channel, storing the received attributes by the control component on the mobile device, wherein the ID application program is configured to use the attributes to prove an identity of the user to another computer system.

Some embodiments may have the advantage that the ID application program provisioned with the two asymmetric cryptographic key pairs may further be personalized. Personalization is understood here to mean the introduction of an electronic identity in the form of attributes into the ID application program. This introduction of the attributes and the use of the attributes is cryptographically secured using the two asymmetric key pairs.

The ID application program is configured to prove the identity of the user of the mobile device. For this purpose, the ID application program can use attributes of the user that identify the corresponding user. These attributes represent an electronic identity of the user. The corresponding attributes and thus the electronic identity of the user is provided, for example, by an ID token, i.e., an electronic identity document. In the course of personalizing the ID application program, for example, attributes are read from the electronic identity document and stored on the mobile device under the management of the ID application program. The resulting electronic identity of the user, which is provided by the mobile device, is also a derived identity that is derived from the electronic identity document. The corresponding electronic identity document may in particular be a sovereign identity document, such as an electronic identity card or an electronic passport.

Furthermore, in the course of personalization, the security element can be used to generate further cryptographic keys, for example attribute-specific or identity-specific keys. The corresponding key material is generated, for example, on the security element of the mobile device and made available to the ID application program. Cryptographic keys and/or intermediate results of cryptographic operations, such as secrets calculated using corresponding cryptographic keys, can be output by the security element to the ID application program for further use. Furthermore, corresponding cryptographic keys can be stored on the security element for the ID application program. To execute cryptographic operations with the corresponding cryptographic keys, the ID application program sends a corresponding request to the security element, which executes the requested cryptographic operation using the cryptographic keys and makes the result available to the ID application program for further use. The corresponding cryptographic operations can be both cryptographic calculations and checks of cryptographic values.

Some embodiments may have the advantage that in the course of such a derivation it can be ensured that the derived identity in the form of the stored attributes is actually stored on the mobile device bound to the user. For example, the attributes can be stored in encrypted form on the mobile device. For example, the attributes are encrypted with a cryptographic key, which is generated in the security element in the course of personalization.

Some embodiments may have the advantage that a binding of the corresponding attributes to the actual owner of the corresponding attributes can be ensured via a binding of the security element to the user of the mobile device. Since, on the one hand, the owner of the attributes or the ID token authenticates himself to the ID token in the course of personalization, i.e. when the first sub-channel is set up, and, on the other hand, the user of the mobile device authenticates himself to the mobile device or the security element in the course of setting up the encrypted communication channel and/or the second sub-channel, a binding between the owner of the attributes and the user of the mobile device is implemented. Both the first and the second sub-channel are established within the encrypted communication channel, i.e., they are cryptographically intertwined with it. This means that the authentications of the attribute owner and the user of the mobile device are also intertwined. This applies in particular if the authentication of the attribute holder to the ID token is carried out via the mobile device, for example using the personalization components of the ID application program. The channel entanglement can ensure that the attributes are read via the same mobile device into which they are introduced in the course of personalization.

This can, for example, prevent an unauthorized user from gaining access to attributes of another user and using them to prove their identity with a forged electronic identity. In the case of proof of identity with the mobile device, it can therefore be advantageously ensured that the attributes presented with the proof of identity are actually attributes of the identified user. For this purpose, the transmission path for reading out the corresponding attributes, i.e., the electronic identity of an identity document, is secured with a transmission path for personalizing the derived identity, i.e., introducing the read-out attributes into a security element of a mobile device using cryptographic means. This ensures that the mobile device used to read the attributes is the same mobile device whose security elements are personalized with the read attributes.

For example, the user must authenticate himself to the ID token when the ID token is read using the mobile device. This ensures that the user initiating or confirming the readout is actually the owner of the corresponding ID document. Furthermore, the user must authenticate himself to the mobile device in the course of personalizing the security element of the mobile device, i.e., in the course of inserting the read attributes. This ensures that the user initiating or confirming the personalization is actually the owner of the mobile device or the user registered on this mobile device. By additionally linking the transmission paths for reading out the attributes and for inserting the attributes or for personalization with cryptographic means, it can be ensured that the mobile device used for reading out and inserting the attributes is the same mobile device assigned to the same user.

If the user has to authenticate himself to both the mobile device and the ID token in the course of reading out the attributes, it can be ensured, for example, that the holder of the ID token is the same person who is also the owner of the mobile device. At the very least, it can be ensured that the holder of the ID token must give their consent together with the owner of the mobile device in the course of the readout and that at least the consent of the owner of the same mobile device is required for the introduction of the corresponding attributes. This makes it impossible for the mobile device used to be exchanged during the reading and insertion of attributes and for the corresponding attributes to come under the control of another user, in particular an unauthorized user. This effectively prevents misuse. To cryptographically bind the transmission path for reading out the attributes to the transmission path for personalizing or inserting the attributes, an encrypted communication channel is established between the mobile device and a personalization server that performs the personalization. This communication channel is encrypted so that it can be ensured that communication via this channel is actually only possible between the two participants who initially established the corresponding communication channel, i.e., the mobile device and the personalization server. In particular, end-to-end encryption can be used for this purpose. For example, encryption is performed on the mobile device using the security element of the mobile device, which is assigned to an operating system of the mobile device, for example, and is configured to establish encrypted communication channels.

The reading out of the ID token on the one hand and the insertion of the read-out attributes into the mobile device in the course of personalization for use by the ID application program to be personalized on the other hand are each carried out, for example, via an independent encrypted sub-channel of the encrypted communication channel. The encrypted sub-channels make it possible to ensure that only subscribers who have set up the corresponding sub-channel and have the corresponding cryptographic keys can communicate with each other via them. In the case of the first encrypted sub-channel between the ID token and the personalization server, these are the corresponding ID token and the personalization server. In the case of the second encrypted sub-channel between the ID application program to be personalized and the personalization server, these are the corresponding ID application program to be personalized, for example the personalization component of the ID application program, and the personalization server. The sub-channels are encrypted sub-channels within the encrypted communication channel. In each case, the transmitted data is encrypted twice. On the one hand, the corresponding data is encrypted by the ID token in the course of reading it from the ID token by a channel-specific ephemeral symmetric cryptographic session key assigned to the corresponding encrypted sub-channel. In the course of transmitting the corresponding encrypted data between the mobile device and the personalization server, it is additionally encrypted a second time by the mobile device with a channel-specific ephemeral symmetric cryptographic session key of the encrypted communication channel. The received personalization server must therefore first decrypt the encryption of the communication channel and then decrypt the encryption of the corresponding sub-channel in order to gain access to the transmitted data.

In the course of personalization, the personalization server uses the same encrypted communication channel throughout. This means that the attributes used for personalization are encrypted with the channel-specific ephemeral symmetric cryptographic session key of the encrypted communication channel. Since only the mobile device already used to read the attributes, for example its security element or the personalization component of the ID application program, is in possession of the same channel-specific ephemeral symmetric cryptographic session key, only the same mobile device is able to decrypt the attributes to be used for personalization. This ensures that the same mobile device that was previously used to read the corresponding attributes is used for personalization. In order to ensure secure transmission of the attributes to be used for personalization to the ID application program of the mobile device to be personalized, another encrypted sub-channel within the encrypted communication channel is used to transmit the attributes. In other words, the corresponding attributes are first encrypted with an ephemeral symmetric cryptographic session key of the corresponding sub-channel and then with the channel-specific ephemeral symmetric cryptographic session key of the encrypted communication channel. The attributes encrypted twice in this way are first decrypted by the mobile device forming the end point of the encrypted communication channel, for example by a security element of the mobile device managing the ephemeral cryptographic session key required for this. The data resulting from this first decryption is provided to the ID application program to be personalized, for example to a personalization component of the ID application program. The ID application program has the cryptographic session key, which is assigned to the corresponding sub-channel, the endpoint of which is the ID application program, for example. This cryptographic session key can also be used to decrypt the second encryption of the transmitted data, which can then be used for personalization by the security element to be personalized.

For example, a secure connection is first established in the form of the encrypted communication channel from the mobile device to the personalization server. The corresponding connection is secured, for example, by mutual authentication or authentication, which allows the participants to ensure with whom they are communicating. Authentication on the part of the mobile device can require authentication of the user of the mobile device to the mobile device. This not only ensures that the communication takes place in the communication channel with or via the mobile device, but also that the communication takes place without the consent of the user of the mobile device. For this purpose, the corresponding user provides an authentication factor, such as a biometric feature or a PIN, in particular a system PIN. The corresponding authentication factor is recorded, for example, by an authentication sensor of the mobile device in the form of authentication data. This can be a biometric sensor, for example, such as a finger scanner or a camera for capturing the user. For example, the corresponding authentication sensor can also be an input device of the mobile device via which the user can enter their PIN, such as a keyboard or a touchscreen. A system PIN is, for example, a PIN of the user assigned to the operating system of the corresponding mobile device. To read attributes from the ID token, i.e., the user's electronic identity document, it is also necessary to authenticate the user to the ID token when setting up the sub-channel. For this purpose, the user can, for example, provide a corresponding authentication factor via the authentication sensor of the mobile device. Alternatively, the corresponding authentication factor can also be provided directly to the ID token if the ID token has the authentication sensor for detecting the corresponding authentication factor. As before, the corresponding authentication factor can be, for example, biometric characteristics of the user or, in particular, a document PIN. A corresponding document PIN is a PIN that is assigned to the corresponding ID token or electronic identity document. An encrypted sub-channel of the encrypted communication channel is set up to transmit the attributes read from the ID token to the personalization server. The corresponding setup is carried out via the encrypted communication channel, for example. The attributes to be read are then transmitted securely from the personalization server to the mobile device or the ID application program to be personalized using double encryption.

To personalize the ID application program, a second sub-channel is established within the encrypted communication channel. In the course of the establishing, for example, authentication of the user to the security element to be personalized is necessary. Authentication is carried out, for example, using the security element of the mobile device, which is, for example, a security element assigned to the operating system of the mobile device. The user authenticates himself to the corresponding security element or is successfully authenticated by the corresponding security element. The security element communicates the successful authentication of the user directly or indirectly to the ID application program to be personalized. For example, the security element calculates a secret for the ID application program or for the control components of the ID application program to generate the ephemeral symmetric session key for encrypting the second sub-channel only if user authentication is successful. By providing the corresponding secret, the ID application program can, for example, infer a successful user authentication by the security element.

The encrypted sub-channel, which is established between the ID application program to be personalized or the control component of the ID application program and the personalization server via the encrypted communication channel, is, for example, the use of an end-to-end encrypted sub-channel. The previously read data, i.e., attributes, from the ID token are now transferred to the ID application program to be personalized via the second sub-channel within the communication channel. The attributes are introduced into the mobile device, for example, in the form of a binary compact data format, such as a CBOR structure ("Concise Binary Object Representation"), i.e., a binary compact data format for serialization. Other formats such as ASN.1, JSON, XML, protoBuf, etc. can also be used to insert the attributes. Other cryptographic elements, such as root signature verification keys, can also be transmitted via the corresponding sub-channel. The root signature verification keys are, for example, CVCA keys of a Country Verifying Certificate Authority, i.e., a national certificate authority for verification. These other cryptographic elements can also be part of the CBOR structure with the attributes, for example. In addition, the corresponding sub-channel can be used to initiate the generation of attribute-specific and thus identity-specific cryptographic keys on the security element, which are assigned to the derived electronic identity of the user of the mobile device stored on the mobile device in the course of personalization. For example, a third asymmetric cryptographic key pair is generated by the security element, which is assigned to the inserted attributes or the created identity. For example, the third public cryptographic key is stored together with attributes or with the electronic identity. This public cryptographic key can be used, for example, to verify attribute-specific or identity-specific signatures created using the third public cryptographic key as a signature key.

Some embodiments may enable preparation for subsequent secure personalization with identity information of a user and its binding to the device in the course of provisioning the mobile device or the ID application program. Some embodiments may have the advantage that they enable secure management of digital or electronic identities using a mobile device. For this purpose, the ID application program for managing electronic identities or identity attributes belonging to electronic identities or defining electronic identities is installed on the mobile device.

The mobile device with the electronic identities managed by the ID application program can be used, for example, for identifying and authenticating, for transmitting identity data and for supporting declarations of intent in a mobile context.

In some embodiments, the electronic identity may comprise an officially recognized identity, such as an electronic identity created on the basis of an official identification document, such as an identity card or passport.

The electronic identity of a user is unique, i.e., unique and unmistakable. It is defined on the basis of characteristics, so-called identity attributes. An electronic identity includes, for example, personal data. Personal data refers to data that enables a person to be identified or can be assigned to a person to whom the personal data relates.

A user may have a plurality of different, application-specific electronic identities. These electronic identities can meet different security requirements. The ID application program may be configured to manage a plurality of electronic identities.

In some embodiments, an electronic identity stored on the mobile device and provided or managed by the ID application program may be used to identify and authenticate the user of the mobile portable device without additional hardware other than the mobile device.

Identity attributes are requested, for example, by service providers or service providers for online services. In some embodiments, a transmission of the identity attributes required by a service provider for its online service is encrypted and authenticated. For example, authorization certificates are used to regulate who can access which identity attributes or has read authorization for them. For example, the required identity attributes are read by an ID provider authorized to do so by means of an authorization certificate and made available to the requesting service provider by the ID provider. In some embodiments, the ID provider only provides the requesting service provider with a confirmation of the requested identity attribute(s). For example, the service provider requests whether the requested identity attributes have one or more characteristics, which is checked by the ID provider server based on the read identity attributes and either confirmed or denied to the service provider.

A consent of the user to use the identity attributes and/or a user authentication is carried out, for example, by checking one or more authentication factors, such as password, PIN, fingerprint or facial recognition.

In some embodiments, the ID application program controls the establishing of the encrypted communication channel between the mobile device and the personalization server. For example, the ID application program comprises a personalization component that controls the personalization on the mobile device side. For example, the personalization component of the ID application program on the mobile device side controls the establishing of the encrypted communication channel as well as the establishing of the first encrypted sub-channel and the second encrypted sub-channel under mediation of the mobile device.

For example, the received attributes are stored on the mobile device by the control component of the ID application program. For example, the attributes are stored in a memory area of the mobile device assigned to the control component and/or the ID application program. For example, the attributes are stored in encrypted form. For example, the attributes are stored in unencrypted form.

In some embodiments, the first encrypted communication channel is encrypted with a first channel-specific ephemeral symmetric cryptographic session key. The first encrypted sub-channel is encrypted with a second channel-specific ephemeral symmetric cryptographic session key. The second encrypted sub-channel is encrypted with a third channel-specific ephemeral symmetric session cryptographic key.

Some embodiments may have the advantage that the encryption in the communication channel as well as in the two encrypted sub-channels are each assigned channel-specific ephemeral symmetric cryptographic session keys. Thus, the sub-channels can each be combined with or executed within the communication channel by using double encryption by the cryptographic session keys assigned to the corresponding channels.

In some embodiments, the first channel-specific ephemeral symmetric cryptographic session key, the second channel-specific ephemeral symmetric cryptographic session key, and the third channel-specific ephemeral symmetric cryptographic session key are each independent of each other.

For example, the first and second encrypted sub-channels are further each assigned a channel-specific ephemeral symmetric cryptographic authentication key for authenticating data transmitted over the corresponding first and second encrypted sub-channels, respectively. For example, a MAC is generated for the corresponding data using the respective channel-specific ephemeral symmetric cryptographic authentication key. The corresponding authentication keys are, for example, cryptographic keys for generating the corresponding MAC.

A MAC is calculated, for example, using a MAC algorithm to which data to be protected, for example the identity attributes, and a cryptographic key, for example a symmetric cryptographic key, are made available as input data. Using this input data, the MAC algorithm calculates a checksum, which serves as the MAC. Block ciphers or hash functions, for example, can be used to calculate MACs. For example, an HMAC (Keyed-Hash Message Authentication Code) can be used as a MAC, for the construction of which a cryptographic hash function, such as the Secure Hash Algorithm (SHA), and a secret cryptographic key, such as a symmetric cryptographic key, are used.

To secure a data transmission, for example a transmission of identity attributes, a cryptographic key, for example a symmetric cryptographic key, is being agreed upon between the sender, for example the ID token, and the receiver, for example a personalization server. The sender uses this cryptographic key to calculate a MAC for the data to be transmitted and sends the calculated MAC together with the data to be transmitted to the receiver. The receiver in turn calculates a MAC for the received data using the cryptographic key and compares the result with the received MAC. If there is a match between the calculated MAC and the received MAC, the integrity check is successful, and the received data is considered authentic.

In the case of a MAC, both sender and receiver must have knowledge of the cryptographic key used, in contrast to the use of pure hash functions or signatures. In the case of pure hash functions, for example, no cryptographic keys are used. If the hash functions are public, anyone can calculate the hash value, especially for manipulated messages. In the case of a signature, only the signer knows the private cryptographic key used to create the signature, i.e., the signature key of an asymmetric key pair used for the signature. The signature recipient only has the public cryptographic key, i.e., the signature verification key, of the asymmetric key pair used for the signature. The signature recipient can therefore verify the signature using the signature verification key but cannot calculate it itself.

In some embodiments, the encryption of the first encrypted communication channel is an end-to-end encryption between the mobile device and the personalization server.

Some embodiments may have the advantage that it can be ensured that the same mobile device always forms an endpoint of the encrypted communication channel. This means that as long as communication takes place via the same encrypted communication channel, the personalization server knows that it is communicating with the same mobile device. This ensures that the mobile device via which the ID token is read is the same mobile device that is personalized with the read data, i.e., attributes of the ID token.

In some embodiments, the encryption of the encrypted communication channel is carried out by the mobile device using a security element of the mobile device, which is assigned, for example, to an operating system of the mobile device. The security element provides, for example, cryptographic keys and/or cryptographic protocols for the operating system.

In some embodiments, the encryption of the first encrypted sub-channel is an end-to-end encryption between the ID token and the personalization server.

Some embodiments may have the advantage that the data transmitted in encrypted form between the ID token and the personalization server can be transmitted at least between the mobile device and the personalization server within the encrypted communication channel. At the same time, the mobile device does not yet have access to the data transmitted via the encrypted sub-channel at this point. This ensures that the corresponding data can only be accessed by the personalization server in the course of personalization. Consequently, misuse or unauthorized reading of attributes can be counteracted. Instead, the attributes can only be read and used for personalization via a trusted instance in the form of the personalization server.

In some embodiments, the encryption of the second encrypted sub-channel is an end-to-end encryption between the ID application program on the mobile device, for example the control component of the ID application program, and the personalization server.

Some embodiments may have the advantage that the end-to-end encryption between the ID application program, for example the control component of the ID application program, and the personalization server can ensure that the ID application program of the mobile device to be personalized is actually personalized and that the data used for personalization is made available exclusively to the ID application program. This can, for example, prevent unauthorized access to the corresponding personalization data.

In some embodiments, the personalizing further comprises:

generating, by the security element, a third asymmetric key pair associated with the ID application program, wherein the third asymmetric key pair comprises a third private cryptographic key and a third public cryptographic key, wherein the third asymmetric key pair is for authenticating the ID application program in the course of using the attributes.

In some embodiments, the security element sends the third public cryptographic key of the ID application program from the security element to the personalization server using the control component via the second encrypted sub-channel within the first encrypted communication channel.

Some embodiments may have the advantage that an individual asymmetric key pair for the individual ID application program may be generated by the security element and provided for use by the ID application program. The public cryptographic key of the corresponding asymmetric key pair is transmitted via the encrypted sub-channel between the ID application program and the personalization server in the encrypted communication channel. The corresponding public cryptographic key, which is generated on the personalized security element in the course of personalization, is thus made available to the personalization server. The personalization server can make the corresponding public cryptographic key available to other instances, for example as a signature verification key. The corresponding signature verification key can be used to ensure that data signed with the associated private cryptographic key actually originates from the personalized security element. For example, the personalization server can issue a certificate for or with the corresponding public cryptographic key. The personalization server can confirm the authenticity of the corresponding public cryptographic key or its assignment to the personalized security element and thus to the corresponding personalized ID application program by means of the corresponding certificate, which is, for example, a certificate of a certificate chain, in particular a PKI.

For example, to initiate the generation of the asymmetric cryptographic key pair associated with the ID application program, the personalization server sends a request to the security element requesting the security element to generate the asymmetric cryptographic key pair associated with the ID application program.

In some embodiments, personalizing further comprises:

receiving one or more root signature verification keys by the control component from the personalization server via the second encrypted sub-channel within the first encrypted communication channel, storing the received root signature verification keys by the control component on the mobile device, wherein the ID application program is configured to use the root signature verification keys to verify certificate signatures of one or more root instances having certificates that are respectively used in the course of reading the attributes to authenticate a reading computer system to the ID application program.

Some embodiments may have the advantage that, in the course of personalization, root signature verification keys can be stored on the mobile device for use by the ID application program. The corresponding root signature verification keys enable the ID application program to verify signatures of root instances, in particular certificate signatures of root instances. If a certificate chain is presented to the ID application program for authenticating a computer system, for example an ID provider server, which intends to access the attributes read and stored in the personalized security element to prove the identity of the user of the mobile device. For example, the root signature verification key can be used to verify an initial certificate of the corresponding certificate chain issued within the certificate chain. If the corresponding initial certificate proves to be authentic, the authenticity of the complete certificate chain can be successively checked and verified. For example, each certificate in the certificate chain is signed using a private cryptographic key of an issuing authority as a signature key. The corresponding signature can, for example, be verified by an associated public cryptographic key provided by the preceding certificate as a signature verification key. Only the initial certificate, which is not preceded by a certificate, is signed with a root signature key of a root instance. This root signature can be checked and verified using a corresponding root signature verification key stored in the personalized security element.

In some embodiments, personalizing further comprises:

receiving a signature of the attributes from the personalization server by the control component via the second encrypted sub-channel within the first encrypted communication channel, wherein the signature serves as a proof of authenticity of the attributes, storing the received signature of the attributes by the control component on the mobile device.

Some embodiments may have the advantage that the authenticity of the attributes can be verified by means of the corresponding signature of the attributes. Consequently, the mobile device, which comprises a corresponding signature of the attributes used for personalization, can also be used offline to verify the identity of the user of the mobile device. For this purpose, the mobile device displays the corresponding attributes including the signature on a display device, for example in the form of a one- or two-dimensional readable machine code, such as a QR code. The corresponding attributes with the signature can then be captured by a reader, for example, and verified using the signature. Furthermore, contactless transmission of the corresponding attributes with the signature to prove the identity of the user of the mobile device to another computer system, for example another mobile device, would also be possible, for example. In this case, too, the authenticity of the corresponding attributes and thus the identity of the user of the mobile device could be proven by means of the signature.

In some embodiments, establishing the first encrypted communication channel comprises negotiating the first channel-specific ephemeral symmetric cryptographic session key.

In some embodiments, negotiating the first channel-specific ephemeral symmetric cryptographic session key comprises:

generating a first random value by the mobile device, generating the first channel-specific ephemeral symmetric crypto-graphic session key using the first random value by the mobile device, receiving by the mobile device from the personalization server a first certificate of the personalization server with a fourth public cryptographic key of a fourth asymmetric cryptographic key pair of the personalization server, encrypting the first random value using the received first public cryptographic key of the personalization server by the mobile device, sending the encrypted first random value to the personalization server by the mobile device to generate the first channel-specific ephemeral symmetric cryptographic session key by the personalization server.

Some embodiments may have the advantage of providing a secure method for providing the first channel-specific ephemeral symmetric cryptographic session key for encrypting the communication channel between the mobile device and the personalization server. For example, a first initial random value is first generated by the mobile device and sent to the personalization server. After receiving the corresponding first initial random value, the personalization server generates a second initial random value, which it sends to the mobile device. This means that both participants, the mobile device, and the personalization server, have both initial random values. Furthermore, the server sends its certificate to the mobile device, for example, and receives a certificate of the mobile device from the mobile device after successfully checking the corresponding certificate. The certificate of the mobile device is, for example, a certificate assigned to the ID application program. The certificate of the mobile device received by the personalization server is also verified. The two certificates each comprise a public cryptographic key, i.e., the certificate of the personalization server comprises a public cryptographic key of an asymmetric key pair of the personalization server and the certificate of the mobile device comprises a public cryptographic key of an asymmetric key pair of the mobile device.

This means that both participants now each have cryptographic keys from the other party, the authenticity of which is verified by a certificate. The mobile device then generates the first random value, for example, which it sends to the personalization server. This means that both participants in the communication now each have three random values from which, for example, the channel-specific symmetric cryptographic session key can be calculated. Furthermore, the mobile device sends, for example, a signature of one, several or all previous messages exchanged in the course of establishing the channel to the personalization server. By verifying the corresponding signature using the public cryptographic key provided by the certificate of the mobile device as a signature verification key, the personalization server can authenticate the mobile device. This is, for example, the first public cryptographic key of the ID application program if the certificate of the mobile device is the certificate assigned to the ID application program with the first public cryptographic key of the ID application program. If the personalization server subsequently sends a message encrypted with the first channel-specific ephemeral symmetric cryptographic session key to the mobile device, this also authenticates the personalization server to the mobile device. The personalization server can only calculate the first channel-specific ephemeral symmetric cryptographic session key if it has a private cryptographic key with which it can decrypt the first random value received from the mobile device. Thus, only the personalization server in possession of the corresponding private cryptographic key, to which the certificate of the personalization server is assigned, is capable of encrypted communication via the encrypted communication channel.

In some embodiments, establishing the first encrypted communication channel further comprises mutually authenticating the ID application program of the mobile device and the personalization server.

Some embodiments may have the advantage that mutual authentication can be used to ensure which participants communicate with each other and between which participants the encrypted communication channel is established. In particular, the identity of the mobile device can be determined, and it can be ensured to which mobile device the electronic identity of the user is assigned or which mobile device is personalized.

In some embodiments, the security element is configured such that a successful authentication of the user to the security element is a prerequisite for authenticating the ID application program of the mobile device to the personalization server. With the authentication, the user declares consent to the personalization of the ID application program.

This ensures that a registered user agrees to the use of the mobile device to personalize the ID application program. For example, the authentication of the ID application program comprises signing a challenge of the personalization server by the security element with the first private cryptographic key of the ID application program, for the use of which a successful user authentication of the registered user is necessary.

In some embodiments, the mobile device sends the certificate with the first public cryptographic key of the ID application program to the personalization server for authentication to the personalization server. The mobile device also sends a message signed by the security element with the first private cryptographic key of the ID application program to the personalization server for authentication.

In some embodiments, the message is a challenge received by the personalization component from the personalization server in the course of a challenge-response procedure.

In some embodiments, establishing the first encrypted sub-channel comprises authenticating the user to the ID token via the mobile device.

Some embodiments may have the advantage that when reading out the ID token, it can be ensured that a corresponding readout is enabled by a holder of the ID token. For example, the user is authenticated to the ID token using the mobile device.

In some embodiments, authenticating the user to the ID token comprises:

receiving, by the personalization component, a further authentication factor of the user detected by the one or more authentication sensors, generating a symmetric cryptographic key using the received further authentication factor, receiving an encrypted second random value by the personalization component from the ID token, wherein the encrypted second random value is encrypted using the symmetric cryptographic key generated by the ID token using a further reference value of the registered user stored in the ID token for verifying the further authentication factor, decrypting the received encrypted second random value using the generated symmetric cryptographic key, generating a first ephemeral asymmetric cryptographic key pair of the ID application program by the security element, comprising a first ephemeral private cryptographic key and a first ephemeral public cryptographic key of the ID application program, sending the first ephemeral public cryptographic key of the ID application program to the ID token, receiving an ephemeral public cryptographic key of the ID token, generating a first secret shared with the ID token by the security element using the decrypted second random value, the first ephemeral private cryptographic key of the ID application program, and the ephemeral public cryptographic key of the ID token, receiving the shared first secret by the control component, generating a first shared authentication key for mutual authentication of the ID application program and the ID token by the control component using the shared first secret, generating a first authentication token using the first authentication key and the first ephemeral public cryptographic key of the ID token by the control component, sending, by the personalization component, the first authentication token generated by the control component to the ID token, receiving a second authentication token from the ID token by the personalization component, which forwards the second authentication token to the control component, verifying the received second authentication token by the control component using the first authentication key and the first ephemeral public cryptographic key of the ID application program.

For example, an ephemeral symmetric cryptographic key is derived using a captured authentication factor of the user. For example, the ephemeral symmetric cryptographic key is derived by the security element of the mobile device. In this case, the authentication factor recorded by the mobile device on the one hand and a reference value stored on the ID token on the other hand each serve as a shared password for deriving the ephemeral symmetric cryptographic key on both sides. The mobile device receives a random value from the ID token, which is encrypted with the same ephemeral symmetric cryptographic key. The ID token derives the corresponding ephemeral symmetric cryptographic key from a reference value for the authentication factor, for example, or the correspondingly derived ephemeral symmetric cryptographic key is stored on the ID token. If the mobile device is able to correctly decrypt the received encrypted random value, this constitutes proof that the mobile device has the correct authentication factor. The mobile device generates an ephemeral asymmetric key pair, the public cryptographic key of which the mobile device sends to the ID token. In return, the mobile device receives the public cryptographic key of the ID token. No static cryptographic keys are therefore required at this point in the process; instead, only randomly generated ephemeral asymmetric key pairs can be used. The mobile device generates a secret shared with the ID token using the decrypted random value, the ephemeral private cryptographic key of the ID application program and the ephemeral public cryptographic key of the ID token. The ID token is also capable of calculating the corresponding secret using the random value it generates, the ephemeral private cryptographic key of the ID token, and the ephemeral public cryptographic key of the mobile device received from the mobile device.

The mobile device can now use the shared secret so generated to calculate a shared authentication key for mutual authentication of the ID application program and the ID token. For example, the mobile device can generate a first authentication token using the corresponding authentication key and the ephemeral public cryptographic key of the ID token. The corresponding authentication token can be sent from the mobile device to the ID token, which can verify the received authentication token using the common authentication key and the ephemeral private cryptographic key of the ID token. This allows the mobile device to authenticate itself to the ID token. In return, the ID token can also send an authentication token to the mobile device. The mobile device receives the authentication token, which is generated, for example, using the shared secret and the ephemeral public cryptographic key of the mobile device. Using the authentication key and the public cryptographic key of the ID application program, the authentication token can be verified.

In some embodiments, an application domain identifier of an application domain of the ID token is further used to generate the shared first secret, wherein the application domain identifier is received together with the encrypted second random value from the ID token by the ID application program.

In some embodiments, the first authentication key is a cryptographic key for generating a message authentication code, wherein the first authentication token is a first MAC of the first ephemeral public cryptographic key of the ID application program generated using the first authentication key.

In some embodiments, the security element further generates a fifth ephemeral symmetric cryptographic key using the shared first secret to encrypt the communication between the mobile device and the ID token.

Some embodiments may have the advantage that an ephemeral symmetric cryptographic key can be provided with which the communication between the mobile device and the ID token can be encrypted. Thus, for example, the further communication between the IT token and the mobile device, the ID token communicating with the personalization server in the course of establishing the second sub-channel, can be encrypted. For example, the communication is encrypted with the corresponding ephemeral symmetric cryptographic key until the encrypted sub-channel between the ID token and the personalization server is established, which enables end-to-end encryption between the ID token and the personalization server.

In some embodiments, establishing the first encrypted sub-channel comprises authenticating the personalization server by the ID token via the mobile device.

Some embodiments may have the advantage that the participants establishing the encrypted sub-channel can be sure with whom they are communicating. In particular, the ID token can thus be sure with whom it is communicating. For authenticating the personalization server by the ID token, for example, a corresponding authentication procedure is used.

In some embodiments, authenticating the personalization server by the ID token comprises:
receiving a second certificate of the personalization server, comprising a second public cryptographic key of a second asymmetric cryptographic key pair of the personalization server, via the first encrypted communication channel,
verifying a signature of the received second certificate of the personalization server,
generating a third random value by the ID token,
sending the third random value as a challenge to the personalization server via the first encrypted communication channel,
receiving a first signature of the challenge as a response from the personalization server via the first encrypted communication channel, wherein the challenge is signed using a second private cryptographic key of the personalization server,
verifying the received first signature using the second public cryptographic key of the personalization server and the sent third random value.

In some embodiments, a second ephemeral public cryptographic key of the personalization server, for example in compressed form, is further received by the ID token via the encrypted communication channel.

In some embodiments, a first data combination comprising the challenge is signed to generate the response. For example, the first data combination comprises the third random value sent as a challenge and the second ephemeral public cryptographic key of the personalization server, for example in compressed form.

Some embodiments may have the advantage that the personalization server can be authenticated by the ID token in a cryptographically secure manner. For this purpose, the ID token receives, for example, a certificate from the personalization server, which provides a public cryptographic key of the personalization server for authenticating. The ID token verifies the signature of the received certificate. For example, the corresponding certificate is received as part of a certificate chain, for the verification of which corresponding signature verification keys, in particular root signature verification keys, are stored on the ID token. This allows the ID token to verify the authenticity of the certificate provided using the certificate chain, for example a PKI. Furthermore, the ID token receives, for example, an ephemeral public cryptographic key from the personalization server. For example, the ID token receives the ephemeral public cryptographic key of the personalization server in compressed form. In return for receiving the personalization server's certificate, the ID token generates a random value, which it sends to the personalization server as a challenge over the encrypted communication channel. Using a private cryptographic key, which forms an asymmetric key pair with the public cryptographic key of the previously provided certificate, the personalization server creates a signature for the challenge as a response to the challenge. For example, to generate the response, a data combination is signed which includes the random value as a challenge and the ephemeral public cryptographic key of the personalization server, for example in compressed form. The ID token receives the corresponding signature via the encrypted communication channel and verifies it using the previously received public cryptographic key of the personalization server as the signature verification key. For this purpose, the ID token also uses, for example, the random value previously sent as a challenge and the previously received ephemeral public cryptographic key of the personalization server.

In some embodiments, the first and second certificates of the personalization server are different certificates with different public cryptographic keys of the personalization server. Thus, in this case, the first and second public cryptographic keys of the personalization server are, for example, different public cryptographic keys of different asymmetric cryptographic key pairs.

In some embodiments, the first and second certificates of the personalization server are the same certificate with the same public cryptographic key of the personalization server. Thus, in this case, the first and second public cryptographic keys of the personalization server are, for example, the same public cryptographic key of the same asymmetric cryptographic key pair.

In some embodiments, the second certificate of the personalization server is a read certificate which proves that the personalization server is authorized to read the attributes to be read from the ID token.

Some embodiments may have the advantage that the personalization server can prove a read authorization for reading the attributes to be read from the ID token by means of the corresponding certificate.

In some embodiments, the second certificate of the personalization server is received as part of a certificate chain, wherein verifying the signature of the received certificate comprises verifying a signature chain of the certificates of the certificate chain. In some embodiments, the certificate chain begins with an initial certificate signed by a root instance whose signature is verifiable with a root signature verification key stored in the ID token. In some embodiments, the certificate chain ends with the certificate of the personalization server.

In some embodiments, the combination further comprises an identifier of the ID token, wherein the identifier of the ID token is further used to verify the received signature.

In some embodiments, the identifier of the ID token is generated using, for example, the ephemeral public cryptographic key of the ID token. For example, the identifier of the ID token is the compressed first ephemeral public cryptographic key of the ID token.

Some embodiments may have the advantage that the identifier can be used to identify the ID token. For example, an ephemeral public cryptographic key of the ID token can be used as the identifier of the ID token, which was previously generated, for example, in the course of authenticating the user to the ID token. The corresponding ID token can, for example, be forwarded from the mobile device to the personalization server. The personalization server thus obtains access to the corresponding ephemeral public cryptographic key, for example, and can use this as an identifier to ensure that the ID token to which it authenticates itself is the same ID token to which the user of the mobile device has previously authenticated himself.

In some embodiments, establishing the first encrypted sub-channel comprises authenticating the ID token to the personalization server via the mobile device.

Some embodiments may have the advantage that a mutual authentication between the ID token and the personalization server takes place in the course of establishing the encrypted sub-channel.

In some embodiments, authenticating the ID token to the personalization server comprises:

sending the public cryptographic key of the ID token from the ID token to the personalization server via the first encrypted communication channel, receiving the second ephemeral public cryptographic key of the personalization server by the ID token from the personalization server via the first encrypted communication channel, generating a second secret shared with the personalization server by the ID token using the private cryptographic key of the ID token and the second ephemeral public cryptographic key of the personalization server, generating a fourth random value by the ID token, generating a second shared authentication key for authenticating data sent over the first encrypted sub-channel by the ID token, wherein the second shared authentication key is generated using the shared second secret and the fourth random value, generating a third authentication token by the ID token using the second authentication key and the second ephemeral public cryptographic key of the personalization server to authenticate the ID token to the personalization server, sending the fourth random value together with the third authentication token for authenticating the ID token by the ID token to the personalization server via the first encrypted communication channel.

Some embodiments may have the advantage that the ID token can authenticate itself to the personalization server in a cryptographically secure manner. For this purpose, the ID token sends a public cryptographic key to the personalization server. This is done via the encrypted communication channel. In return, the ID token receives an ephemeral public cryptographic key from the personalization server via the encrypted communication channel. The ID token computes a secret shared with the personalization server using the private cryptographic key of the ID token and the received ephemeral public cryptographic key of the personalization server. The personalization server can compute the same shared secret using the public cryptographic key of the ID token and the ephemeral private cryptographic key of the personalization server. The ID token generates a random value which it uses to calculate a shared authentication key. The authentication key is used to authenticate data sent via the encrypted sub-channel. The ID token generates the corresponding shared authentication key using the random value and the shared secret. Furthermore, the ID token generates an authentication token using the corresponding authentication key and the ephemeral key of the personalization server. The ID token sends the authentication token generated in this way together with the random value to the personalization server in the communication channel. By receiving the random value, the personalization server is also able to calculate the authentication key using the shared secret. With this shared authentication key and the personalization server's ephemeral public cryptographic key, the personalization server can verify the received authentication token. If the verification is successful, the ID token is also successfully authenticated against the personalization server and a successful mutual authentication of ID token and personalization server is realized. Furthermore, the calculated common authentication key can be used to authenticate data that is exchanged between the ID token and the personalization server via the encrypted sub-channel.

In some embodiments, the ephemeral public cryptographic key of the personalization server received in the course of authenticating the personalization server, for example in compressed form, is compared with the ephemeral public cryptographic key of the personalization server received in the course of authenticating the ID token, wherein a match of both ephemeral public cryptographic keys of the personalization server is a prerequisite for generating the shared second secret. For example, the ephemeral public cryptographic key of the personalization server received in the course of authenticating the ID token is compressed for the purpose of comparison.

Some embodiments may have the advantage that a binding may be established between the personalization server and the authentication server communicated with in the course of authenticating the ID token.

In some embodiments, an application domain identifier of an application domain of the ID token is further used to generate the shared second secret, wherein the application domain identifier is sent from the ID token to the personalization server together with the public cryptographic key of the ID token.

Some embodiments may have the advantage that the ID token can be assigned to a specific application domain.

In some embodiments, the second authentication key is a cryptographic key for generating a message authentication code, wherein the second authentication token is a second MAC of the second ephemeral public cryptographic key of the personalization server generated using the second authentication key.

In some embodiments, the ID token further generates the second channel-specific ephemeral symmetric cryptographic session key using the shared second secret and fourth random value.

Some embodiments may have the advantage that a channel-specific ephemeral symmetric cryptographic session key for the sub-channel may be provided in a cryptographically secure manner, which is known only to the ID token and the personalization server. This enables end-to-end encryption via the encrypted sub-channel between the ID token and the personalization server.

The mobile device can serve, for example, as an authentication token, authorization token and/or as proof of identity, i.e., ID token, for example in electronic business processes. For this purpose, the user can be securely authenticated by the mobile device.

The mobile device is configured for secure user authentication using the authentication sensor and the operating system or the security element. The authentication can be based, for example, on capturing and evaluating biometric characteristics of the user.

Some embodiments may have the advantage that manufacturers of ID application programs or the corresponding ID application programs can use the authentication functionality of the mobile device for user authentication. The authentication functionality of the end device using the authentication sensor and the security element implement a secure binding of the user with the end device.

The security element, which is, for example, a hardware-based security element of the device manufacturer, provides cryptographic means, such as cryptographic key material and protocols, which can be used to securely provide the authentication results of the user of the mobile device for an ID application program installed on the mobile device. The security element thus ensures, for example, the cryptographic security of the operating system or provides the operating system with cryptographic security functionality. In some embodiments, the security element may also be a hardware-based security element of the device manufacturer, for example. Furthermore, the security element provides cryptographic key material which is assigned to the ID application program.

In some embodiments, establishing the second encrypted sub-channel further comprises authenticating the personalization server by the control component.

Some embodiments may have the advantage that a prerequisite for establishing the second encrypted sub-channel is a successful authentication of the personalization server by the security element. Thus, the security element can not only be sure that the personalization is performed by the same personalization server that has read the attributes from the ID token, but also that the corresponding security element is authorized to personalize the corresponding security element.

In some embodiments, authenticating the personalization server by the control component comprises:

sending a challenge from the control component to the personalization server via the first encrypted communication channel, receiving a response from the personalization server by the control component, wherein the response is a signature of the challenge created using a third private cryptographic key of a third asymmetric key pair of the personalization server, receiving a third ephemeral public cryptographic key of the personalization server by the control component, verifying the received response using a third public cryptographic key of the third asymmetric key pair of the personalization server and the sent challenge, storing the third ephemeral public cryptographic key of the personalization server by the control component on the mobile device.

In some embodiments, the challenge is a random value.

In some embodiments, a third ephemeral public cryptographic key of the personalization server, for example in compressed form, is further received by the control component via the encrypted communication channel.

In some embodiments, a second data combination comprising the challenge is signed to generate the response. For example, in addition to the fifth random value sent as a challenge, the second data combination comprises the third ephemeral public cryptographic key of the personalization server, for example in compressed form.

Some embodiments may have the advantage that the ID application program to be personalized first receives a certificate from the personalization server via the encrypted communication channel. The corresponding certificate can be verified by the security element. For example, the corresponding certificate is provided as part of a certificate chain, which the security element can verify with stored root signature verification keys. The ID token can therefore verify the authenticity of the certificate provided using the certificate chain, for example a PKI. Furthermore, the security element receives an ephemeral public cryptographic key from the personalization server. For example, the security element receives the ephemeral public cryptographic key of the personalization server in compressed form. In return for receiving the personalization server's certificate, the security element generates a random value and sends the corresponding random value as a challenge to the personalization server. In response to sending the random value as a challenge, the security element receives a signature of the challenge as a response from the personalization server via the encrypted communication channel. To create the signature, the private cryptographic key of the personalization server is used, which forms an asymmetric key pair with the public cryptographic key of the previously provided certificate. For example, a data combination is signed to generate the response. The corresponding data combination includes, for example, the random value previously sent as a challenge and the ephemeral public cryptographic key of the personalization server, for example in compressed form. The security element can verify the corresponding signature using the previously received public cryptographic key of the personalization server as a signature verification key. For this purpose, the security element also uses, for example, the ephemeral public cryptographic key of the personalization server and the random value previously sent as a challenge. If the signature check is successful, the personalization server is considered successfully authenticated.

In some embodiments, authenticating the personalization server by the control component further comprises receiving a third certificate of the personalization server comprising the third public cryptographic key of the personalization server by the control component via the first encrypted communication channel.

In some embodiments, the first, second and/or third personalization server certificates are different certificates with different personalization server public cryptographic keys. Thus, in this case, the first, second and/or third public cryptographic keys of the personalization server are, for example, different public cryptographic keys of different asymmetric cryptographic key pairs.

In some embodiments, the first, second and/or third certificate of the personalization server is the same certificate with the same public cryptographic key of the personalization server. Thus, in this case, the first, second and/or third public cryptographic key of the personalization server is, for example, the same public cryptographic key of the same asymmetric cryptographic key pair.

In some embodiments, the certificate is received as part of a certificate chain, wherein verifying the signature of the received certificate comprises verifying a signature chain of the certificates of the certificate chain. In some embodiments, the certificate chain begins with a first certificate signed by a root instance whose signature is verifiable with a root signature verification key to which the ID application program has access. In some embodiments, the certificate chain ends with the certificate of the personalization server.

In some embodiments, establishing the second encrypted sub-channel further comprises authenticating the control component to the personalization server.

Some embodiments may have the advantage that an authentication of the control component towards the personalization server is performed. Thus, for example, a mutual authentication between the control component or the ID application program and the personalization server can be implemented.

In some embodiments, authenticating the ID application program by the control component to the personalization server comprises:

sending, from the control component to the security element, a request to generate a third secret shared with the personalization server, the request comprising the third ephemeral public cryptographic key of the personalization server, in response to the request, receiving by the control component the shared third secret generated by the security element, wherein the generation of the shared third secret by the security element is performed using the second private cryptographic key of the ID application program and the third ephemeral public cryptographic key of the personalization server, generating a sixth random value by the control component, generating a third shared authentication key for authenticating data sent over the second encrypted sub-channel by the control component, wherein the third shared authentication key is generated using the shared third secret and the sixth random value, generating, by the control component, a fourth authentication token using the third authentication key and the third ephemeral public cryptographic key of the personalization server to authenticate the ID application program to the personalization server, sending the sixth random value together with the fourth authentication token to authenticate the ID application program by the control component to the personalization server via the first encrypted communication channel.

Some embodiments may have the advantage that the ID application program that has not yet been personalized can authenticate itself to the personalization server. For this purpose, the corresponding ID application program to be personalized first uses a stored initial key of the security element. The corresponding initial key is stored on the security element, for example, in the course of provisioning the security element. To authenticate the security element, the corresponding security element first receives, for example, an ephemeral public cryptographic key generated for the purpose of authentication from the personalization server. The personalization server generates the corresponding public cryptographic key, for example, for authenticating the security element to be personalized. The security element receives the cryptographic key via the encrypted communication channel, for example. The security element calculates a shared secret using the initial private cryptographic key of the security element and the received ephemeral public cryptographic key of the personalization server. The ID application program to be personalized generates a random value. The ID application program to be personalized uses the corresponding random value to generate a common authentication key. The shared secret is also used to generate the corresponding shared authentication key. The security element also generates an authentication token. The security element generates the corresponding authentication token using the previously received public cryptographic key of the personalization server and the previously generated shared authentication key. The ID application program to be personalized sends this authentication token together with the random value to the personalization server via the encrypted communication channel. The personalization server can also initially calculate the shared secret. For this purpose, the personalization server uses an initial public cryptographic key of the security element, which is known to the personalization server. For example, the corresponding initialization key was generated in the course of provisioning the security element to be personalized and made available to the personalization server. Furthermore, the personalization server uses the ephemeral private cryptographic key of the personalization server to calculate the shared secret. With the corresponding shared secret, the personalization server is able to calculate the shared authentication key. For this purpose, the personalization server uses the received random value and the previously calculated shared secret. Thus, the personalization server can verify the received authentication token using the shared authentication key and the ephemeral public cryptographic key of the personalization server.

Thus, the ID application program to be personalized can be authenticated. This can have the advantage, for example, that the participants in the encrypted sub-channel between the security element to be personalized and the personalization server know who they are communicating with or can ensure that they are communicating with the correct participant. Furthermore, the shared authentication key can be used to authenticate data exchanged between the security element to be personalized and the personalization server via the second encrypted sub-channel.

In some embodiments, the ephemeral public cryptographic key of the personalization server received in the course of authenticating the personalization server, for example in compressed form, is combined with the ephemeral public cryptographic key of the personalization server received in the course of authenticating the ID application program, the ephemeral public cryptographic key of the personalization server received in the course of authenticating the ID application program, for example in compressed form, wherein a match of both ephemeral public cryptographic keys of the personalization server is a prerequisite for generating the shared secret.

In some embodiments, the third authentication key is a cryptographic key for generating a message authentication code, wherein the third authentication token is a third MAC of the third ephemeral public cryptographic key of the personalization server generated using the third authentication key.

In some embodiments, the security element is configured such that a prerequisite for the generation of the shared third secret by the security element is a successful authentication of the user to the security element. With the authentication, the user declares consent to establishing the second encrypted sub-channel.

This ensures that a registered user agrees to the authentication of the control component or the ID application program to the personalization server and thus to establishing the second encrypted sub-channel. To generate the shared third secret, it is necessary, for example, to use the second private cryptographic key of the ID application program, which is bound, for example, to successful user authentication of the registered user.

In some embodiments, the control component further generates the third channel-specific ephemeral symmetric cryptographic session key using the shared third secret and the sixth random value.

Some embodiments may have the advantage that a channel-specific ephemeral symmetric cryptographic session key can be provided to the ID application program to be personalized and to the personalization server, by means of which the second sub-channel can be encrypted. In particular, end-to-end encryption can thus be realized between the endpoints of the corresponding sub-channel, i.e., the security element to be personalized and the personalization server.

In some embodiments, a plurality of ID tokens is used for personalization.

In some embodiments, a second ID token is further used for personalization. The personalization further comprises:

establishing a third encrypted sub-channel between the second ID token and the personalization server within the encrypted communication channel via the mobile device, wherein the ID application program is used to establish the third encrypted sub-channel, reading one or more of the second attributes from the second ID token by the personalization server via the third encrypted sub-channel within the encrypted communication channel, establishing a fourth encrypted sub-channel between the control component and the personalization server within the encrypted communication channel, wherein the ID application program is used to establish the fourth encrypted sub-channel, receiving the read-out second attributes by the control component from the personalization server via the fourth encrypted sub-channel within the encrypted communication channel, storing the received second attributes by the control component, wherein the ID application program is configured to use the second attributes to prove an identity of the user to another computer system.

Some embodiments may have the advantage that attributes can be read from different ID tokens and stored in the security element of the mobile device to be personalized in the course of personalization. This means that not only digital identities that reflect identities provided by an ID token, i.e., an electronic identity document, can be stored on the mobile device, but also identities that represent combinations of attributes from corresponding ID tokens. For example, the attributes from different ID tokens are read via the same encrypted communication channel.

For example, attributes from different ID tokens are read via different encrypted communication channels. As an example of embodiments, a third encrypted communication channel is established between the mobile device and the personalization server via the network, within which a third and fourth encrypted sub-channel is established.

For example, the ID application program is configured to use the second attributes in combination with the first attributes to prove an identity of the user to another computer system, such as an ID provider server.

In some embodiments, the method further comprises using the cryptographically secured electronic identity. One or more of the introduced attributes are provided to an ID provider server. The using comprises:

establishing a second encrypted communication channel between the mobile device and the ID provider server over the network, receiving a read request from an ID provider server to read one or more of the attributes of the electronic identity, authenticating the ID provider server by the ID application program using the control component, authenticating the ID application program to the ID provider server by the security element using the control component, reading the attributes to be read from the mobile device by the ID provider server over the network using the control component.

Some embodiments may have the advantage that the cryptographically secured electronic identity created in the course of personalization or introduced into the ID application program can be used to prove the identity of the user of the mobile device.

Thus, the mobile device with the ID application program can be used as a portable electronic ID document. For example, the mobile device is a smartphone that has an ID function with the ID application program. To use the electronic identity, attributes of the corresponding electronic identity are read from the mobile device by an ID provider server in a cryptographically secure manner and made available to a service provider, for example. Reading out the attributes by an ID provider server can have the advantage that it can be ensured that only an authorized entity that can prove the corresponding authorization, for example by means of a certificate, is able to read attributes from the mobile device in a cryptographically secure manner.

In the course of using the electronic identity, an encrypted communication channel is first established between the mobile device and the ID provider server. The mobile device or the ID application program receives a read request from the ID provider to read one or more attributes of the electronic identity. For example, the read request identifies the attributes to be read. Furthermore, the read request specifies, for example, who is requesting the corresponding attributes, i.e., to whom the ID provider server will forward the corresponding attributes, as well as their intended use. This information provided by the read request is displayed, for example, on a display device of the mobile device for the user so that the user can check the corresponding information. Furthermore, the user of the mobile device can be offered the option of selecting which of the requested attributes should actually be made available to the ID provider server and/or selecting further attributes which should also be made available to the ID provider server.

To read the attributes in a cryptographically secure manner, the ID provider server is authenticated by the ID application program and the ID application program is authenticated against the ID provider server. To authenticate the ID application program to the ID provider server, the mobile device or the ID application program uses the security element of the mobile device, which manages the private cryptographic keys of the ID application program. Following successful mutual authentication, the attributes to be read from the mobile device are read by the ID provider server via the network. The ID provider server can then sign the read attributes, for example, and make them available to a requesting service provider. The corresponding service provider can check the authenticity of the attributes provided to it using the signature of the ID provider server.

Some embodiments may have the advantage that communication via the second communication channel can take place in an encrypted and thus cryptographically secure manner.

In the course of negotiating the channel-specific ephemeral symmetric cryptographic session key for encrypting the second communication channel, for example, a random value generated by the mobile device, such as the control component, is first provided. This random value is used to generate a channel-specific ephemeral symmetric cryptographic session key for encrypting the communication via the second communication channel. For example, input parameters are used to generate the channel-specific ephemeral symmetric cryptographic session key. For example, the mobile device receives another random value from the ID provider server. For example, the mobile device calculates another random value.

The mobile device also receives a certificate from the ID provider server. This certificate of the ID provider server provides a public cryptographic key of an asymmetric cryptographic key pair of the ID provider server. The mobile device encrypts the previously calculated random value using the public cryptographic key of the ID provider server provided by the certificate and sends this encrypted random value to the ID provider server. The ID provider server receives the encrypted random value, can decrypt it, and also use it to calculate the channel-specific ephemeral symmetric cryptographic session key.

In some embodiments, the second encrypted communication channel is encrypted with a fourth channel-specific ephemeral symmetric cryptographic session key.

In some embodiments, the encryption of the second encrypted communication channel is an end-to-end encryption between the mobile device and the ID provider server.

In some embodiments, establishing the second encrypted communication channel comprises negotiating the fourth channel-specific ephemeral symmetric cryptographic session key.

In some embodiments, negotiating the fourth channel-specific ephemeral symmetric cryptographic session key comprises:

generating a seventh random value by the mobile device, generating the fourth channel-specific ephemeral symmetric cryptographic session key using the seventh random value by the mobile device, receiving a first certificate of the ID provider server with a fifth public cryptographic key of a fifth asymmetric cryptographic key pair of the ID provider server by the mobile device from the ID provider server, encrypting the seventh random value using the received fifth public cryptographic key of the ID provider server by the mobile device, sending the encrypted seventh random value to the ID provider server by the mobile device to generate the fourth channel-specific ephemeral symmetric cryptographic session key by the ID provider server.

In some embodiments, the mobile device further receives an eighth random value from the ID provider server and generates a ninth random value, wherein the eighth and ninth random values are also used to generate the fourth channel-specific ephemeral symmetric cryptographic session key by the mobile device.

In some embodiments, authenticating the ID provider server using the control component comprises:

sending a challenge from the control component to the ID provider server via the second encrypted communication channel, receiving a response from the ID provider server by the control component, wherein the response is a signature of the challenge created using the private cryptographic key of an asymmetric key pair of the ID provider server, receiving, by the control component, a fourth ephemeral public cryptographic key of an ephemeral key pair of the ID provider server, verifying the received response using a public cryptographic key of the asymmetric key pair of the ID provider server and the sent challenge, storing the fourth ephemeral public cryptographic key of the ID provider server by the control component on the mobile device.

Some embodiments may have the advantage that authenticating the ID provider server can be performed using a challenge-response method, for example. For this purpose, the control component sends a challenge to the ID provider server via the encrypted communication channel. The ID provider server creates a response to the challenge. The response is a signature of the challenge created using a private cryptographic key of an asymmetric key pair of the ID provider server. The ID provider server sends the corresponding response to the mobile device, which receives the response. Furthermore, the mobile device receives an ephemeral public cryptographic key of an ephemeral cryptographic key pair of the ID provider server. The control component of the ID application program verifies the received response using a public cryptographic key of the asymmetric key pair of the ID provider server and the sent challenge. During the verification process, the program checks whether the response is actually a signature of the challenge sent using the private cryptographic key of the ID provider server. If the verification is successful, i.e., the ID provider server has been successfully authenticated by the ID application program, the mobile device stores the received ephemeral public cryptographic key of the ID provider server.

In some embodiments, the fourth ephemeral public cryptographic key of the ID provider server is received from the control component, for example in a compressed form. In some embodiments, the fourth ephemeral public cryptographic key of the ID provider server is received, for example, in uncompressed form.

In some embodiments, the challenge is a random value.

In some embodiments, authenticating the ID provider server by the control component further comprises receiving a certificate of the ID provider server, comprising the public cryptographic key of the ID provider server, by the control component via the second encrypted communication channel.

The corresponding certificate of the ID provider server can, for example, be received together with a certificate chain, the validity of which is verified using a root certificate as previously stored for the control component on the mobile device.

In some embodiments, authenticating the ID application program to the ID provider server by the security element using the control component comprises:

sending, from the control component to the security element, a request to generate a fourth secret shared with the ID provider server, the request comprising the fourth ephemeral public cryptographic key of the ID provider server, in response to the request, receiving by the control component the shared fourth secret generated by the security element, wherein the generation of the shared fourth secret by the security element is performed using the first private cryptographic key of the ID application program and the fourth ephemeral public cryptographic key of the ID provider server, generating a tenth random value by the control component, generating a fourth shared authentication key for authenticating data to the ID provider server by the control component, wherein the fourth shared authentication key is generated using the shared fourth secret and the tenth random value, generating a fifth authentication token by the control component using the fourth authentication key and the fourth ephemeral public cryptographic key of the ID provider server to authenticate the ID application program to the ID provider server, sending the tenth random value together with the fifth authentication token for authenticating the ID application program by the control component to the ID provider server via the second encrypted communication channel.

Some embodiments may have the advantage that the ID application program can authenticate itself to the ID provider server in the course of calculating shared symmetric cryptographic keys. For example, the control component sends a request to the security element to generate a shared secret with the ID provider server using the private cryptographic key of the ID application program. With the request, the control component provides the security element with, for example, the ephemeral public cryptographic key of the ID provider server. The control component has previously received this ephemeral public cryptographic key of the ID provider server, for example, in the course of authenticating the ID provider server. For example, the control component has received the corresponding public cryptographic key in uncompressed form. Alternatively, the control component can receive the ephemeral public cryptographic key of the ID provider server from the ID provider server in the course of authenticating the ID application program. For example, the control component receives the ephemeral public cryptographic key of the ID provider server in compressed form in the course of authenticating the ID provider server, compresses the public cryptographic key of the ID provider server received in uncompressed form in the course of authenticating the ID application program and compares the two with each other.

The security element generates the requested secret using the second private cryptographic key of the ID application program and the ephemeral public cryptographic key of the ID provider server and provides it to the control component. The control component uses the shared secret to generate a shared authentication key for authenticating data that is exchanged with the ID provider server. The corresponding authentication key is, for example, a symmetric cryptographic key. The control component also uses a random value to generate the authentication key. This random value is generated on the mobile device, for example by the control component. Using the authentication key and the ephemeral public cryptographic key of the ID provider server, the control component generates an authentication token. The control component sends the authentication token generated in this way to the ID provider server together with the random value to authenticate the ID application program to the ID provider server. Using the random value received from the ID application program or from the control component, the ID provider server can also generate the authentication key. The shared secret required for this is calculated by the ID provider server using, for example, an ephemeral private cryptographic key of the ephemeral asymmetric key pair of the ID provider server and the public cryptographic key of the ID application program. Using the authentication key and its ephemeral public cryptographic key, the ID provider server can check the validity of the received authentication token.

In some embodiments, the fifth authentication key is a cryptographic key for generating a message authentication code, wherein the fifth authentication token is a fourth MAC of the fourth ephemeral public cryptographic key of the ID application program generated using the fifth authentication key.

In some embodiments, the security element is configured such that a prerequisite for authenticating the ID application program of the mobile device to the ID provider server by the security element is a successful authentication of the user to the security element. With the authentication, the user declares consent to the reading of the attributes to be read by the ID provider server.

Some embodiments may have the advantage that it can be ensured that authentication of the ID application program to the ID provider server and thus reading of attributes from the ID application program is only possible with the consent of the user of the mobile device. During the authentication of the user of the mobile device, it is ensured that the confirmed user is actually the registered user. To generate the shared fourth secret in the course of authentication of the ID application program, it is necessary, for example, to use the first private cryptographic key of the ID application program, which is bound, for example, to successful user authentication of the registered user.

In some embodiments, the control component further generates a fourth ephemeral symmetric cryptographic session key using the shared fourth secret and the tenth random value.

Some embodiments may have the advantage that the ephemeral symmetric cryptographic session key may be used to encrypt a communication between the ID provider server and the ID application program.

In some embodiments, the attributes to be read are encrypted using the fourth ephemeral symmetric cryptographic session key and sent to the ID provider server via the second encrypted communication channel.

Some embodiments may have the advantage that the attributes to be read can be sent to the ID provider server in a cryptographically secure manner.

Some embodiments further comprise a mobile device comprising a processor and a memory. An ID application program for providing an electronic identity is stored in the memory. The processor is configured to execute a method for creating a cryptographically secured electronic identity of a user on a mobile device. The ID application program comprises a control component for controlling the creation of the electronic identity. The ID application program further comprises a provisioning component for executing provisioning of the ID application program in the course of creating the cryptographically secured electronic identity. The mobile device further comprises a security element. The mobile device further comprises a communication interface for communicating via a network with a personalization server.

Provisioning the ID application program comprises:

in response to a security inspection request from the provisioning component, performing a remote security inspection of the security infrastructure of the mobile device using the control component by a personalization server over a network, receiving a result of the remote security inspection from the personalization server, which the control component forwards to the provisioning component, in response to a positive result of the remote security inspection, sending a key generation request from the provisioning component to the control component, which the control component forwards to the security element, in response to the key generation request, generating by the security element a first asymmetric key pair associated with the ID application program and a second asymmetric key pair associated with the ID application program; wherein the first asymmetric key pair comprises a first private cryptographic key and a first public cryptographic key, wherein the second asymmetric key pair comprises a second private cryptographic key and a second public cryptographic key, wherein the security element sends the first and second public cryptographic keys to the control component, which forwards the two public cryptographic keys to the provisioning component, upon receipt of the two public cryptographic keys, generating a certificate request by the provisioning component for generating a certificate of the ID application program comprising the first public cryptographic key, wherein the certificate request comprises the first public cryptographic key, sending the certificate request by the provisioning component over the network to the personalization server, the certificate request comprising the first public cryptographic key, wherein the provisioning component sends the second public cryptographic key to the personalization server in addition to the certificate request, in response to the certificate request, receiving the certificate generated by the personalization server with the first public cryptographic key and a root certificate of a root instance of a PKI by the personalization component, storing the certificate of the ID application program and the root certificate on the mobile device.

In some embodiments, the mobile device is configured to implement each of the previously described embodiments of the method for creating the cryptographically secured electronic identity of the user on the mobile device.

In some embodiments, creating the cryptographically secured electronic identity further comprises personalizing the ID application program on the mobile device using an ID token. The ID application program further comprises a personalization component for performing personalization of the ID application program in the course of creating the cryptographically secured electronic identity.

The personalizing comprises:

establishing an encrypted communication channel between the mobile device and the personalization server over the network, wherein the personalization component is used to establish the encrypted communication channel, establishing a first encrypted sub-channel between the ID token and the personalization server within the encrypted communication channel via the mobile device, wherein the personalization component is used to establish the first encrypted sub-channel, reading one or more of the attributes from the ID token by the personalization server via the first encrypted sub-channel within the encrypted communication channel, establishing a second encrypted sub-channel between the control component and the personalization server within the encrypted communication channel, wherein the personalization component is used to establish the second encrypted sub-channel, receiving the read attributes by the control component from the personalization server via the second encrypted sub-channel within the encrypted communication channel, storing the received attributes by the control component on the mobile device, wherein the ID application program is configured to use the attributes to prove an identity of the user to another computer system.

Some embodiments comprise a system. The system comprises a mobile device according to one of the embodiments of a mobile device described above and a personalization server. The personalization server is configured to perform a remote security inspection of the security infrastructure of the mobile device via the network, to receive the certificate request with the first public cryptographic key generated by the security element of the mobile device, for receiving the second public cryptographic key generated by the security element of the mobile device, for creating a certificate with the first public cryptographic key, for providing a root certificate of a root instance of a PKI, and for reading attributes from an ID token via the mobile device and for personalizing the ID application program of the mobile device.

In some embodiments, the system is configured to implement each of the previously described embodiments of the method for creating the crypto-graphically secured electronic identity of the user on the mobile device.

In some embodiments, the system further comprises the ID token in which the attributes to be read are stored.

In some embodiments, the system further comprises an ID provider server. The ID provider server is configured for creating a read request for reading one or more of the attributes of the electronic identity provided by the ID application program, sending the read request to the mobile device for authenticating to the ID application program, authenticating the ID application program, and reading the attributes to be read from the mobile device over the network.

In the following, embodiments of the invention are explained in more detail with reference to the drawings, in which.

Figure 3:
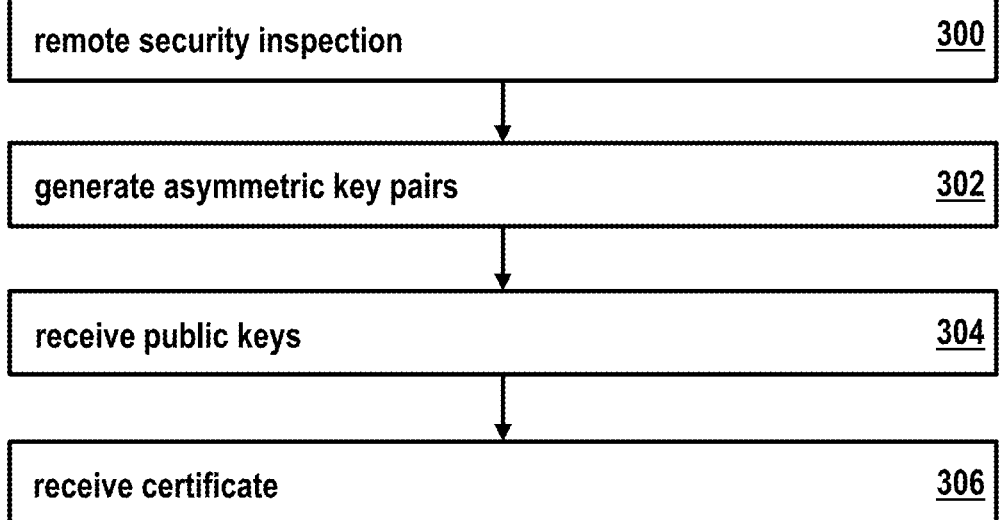
Figure 4:
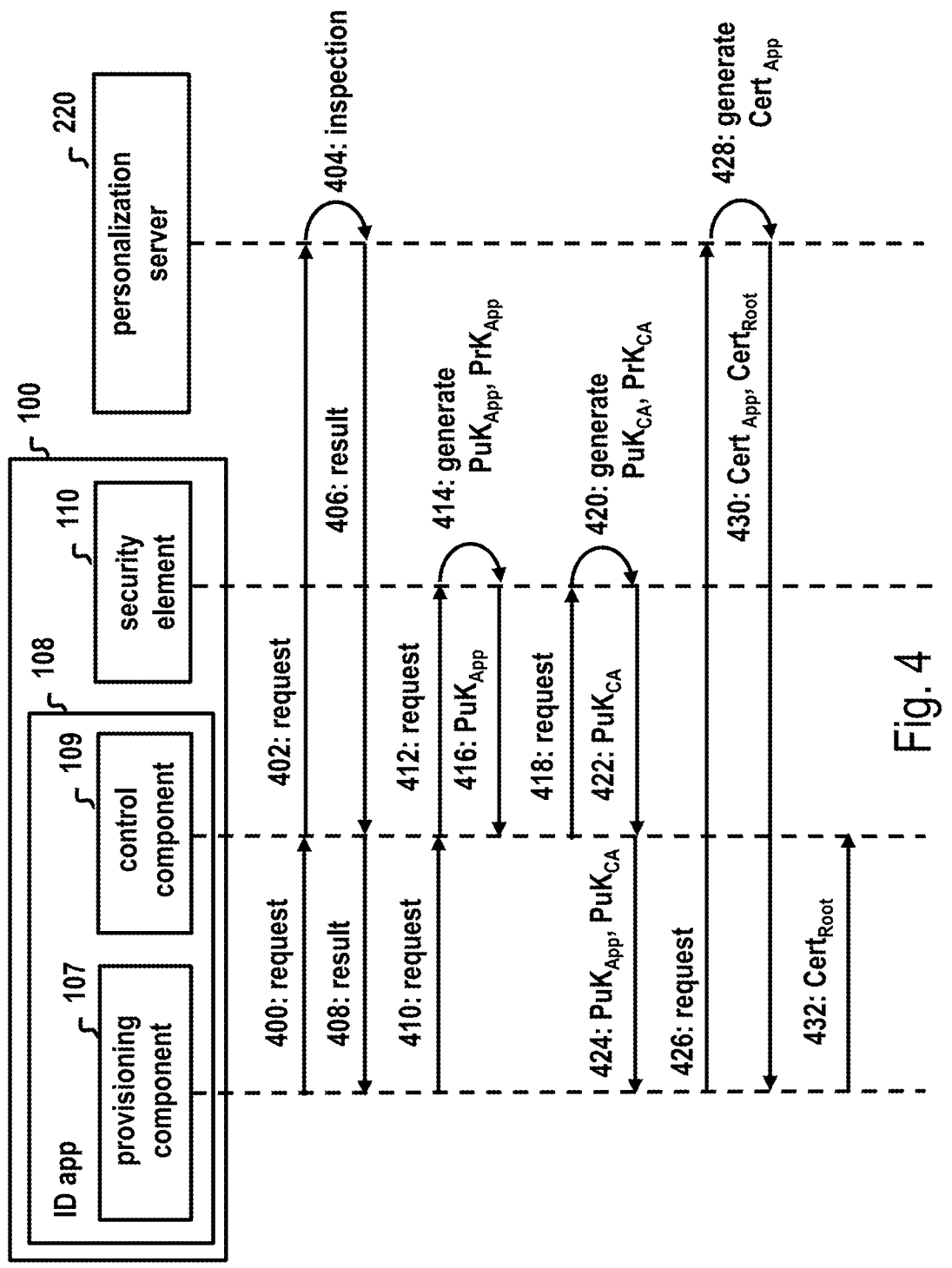
Figure 5:
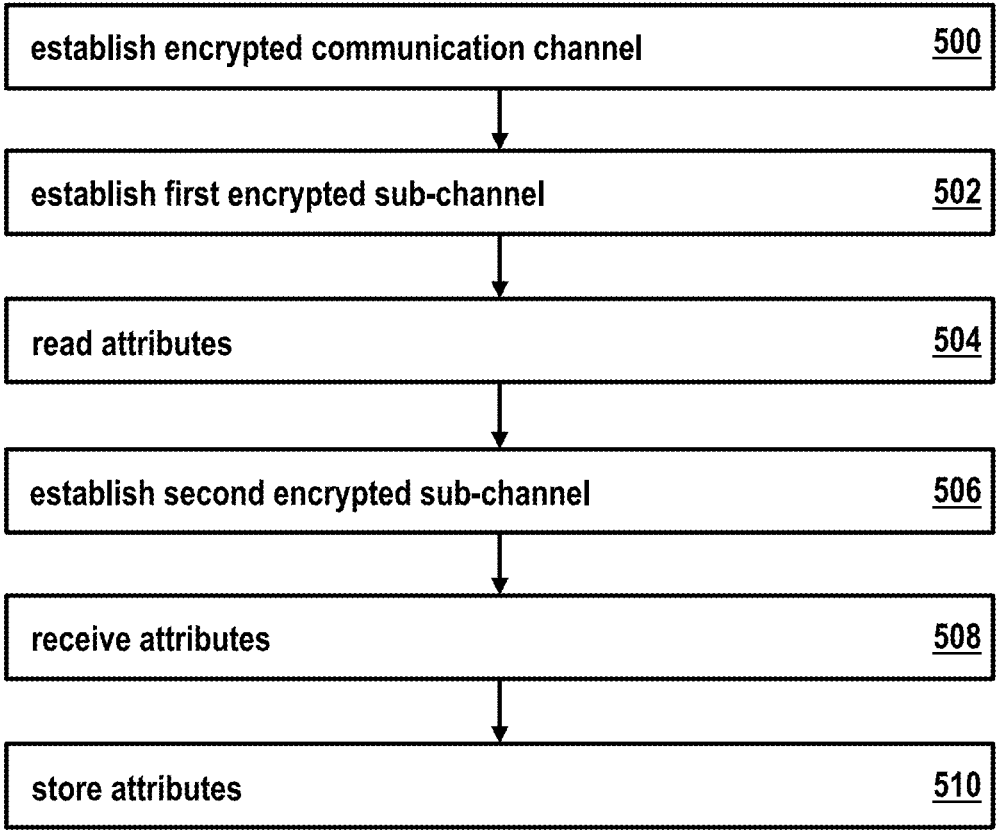
Figure 6:
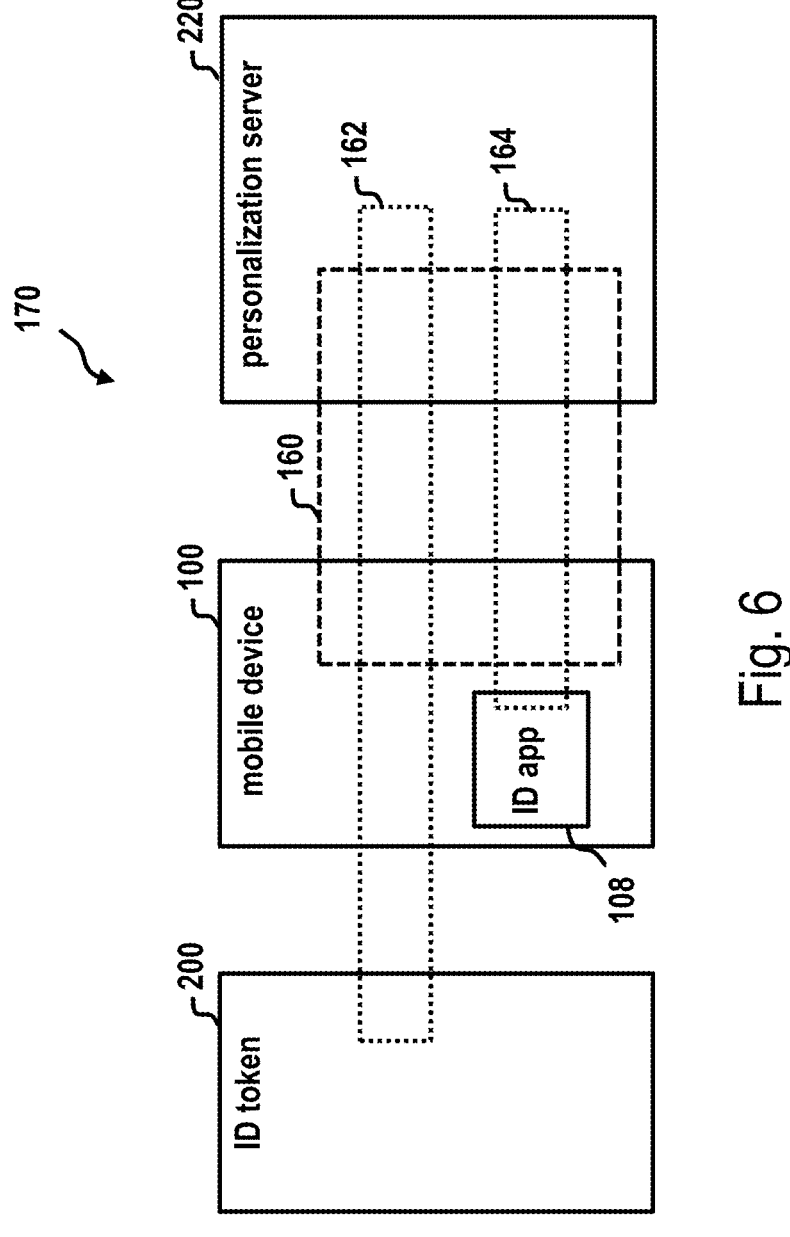
Figure 7A:
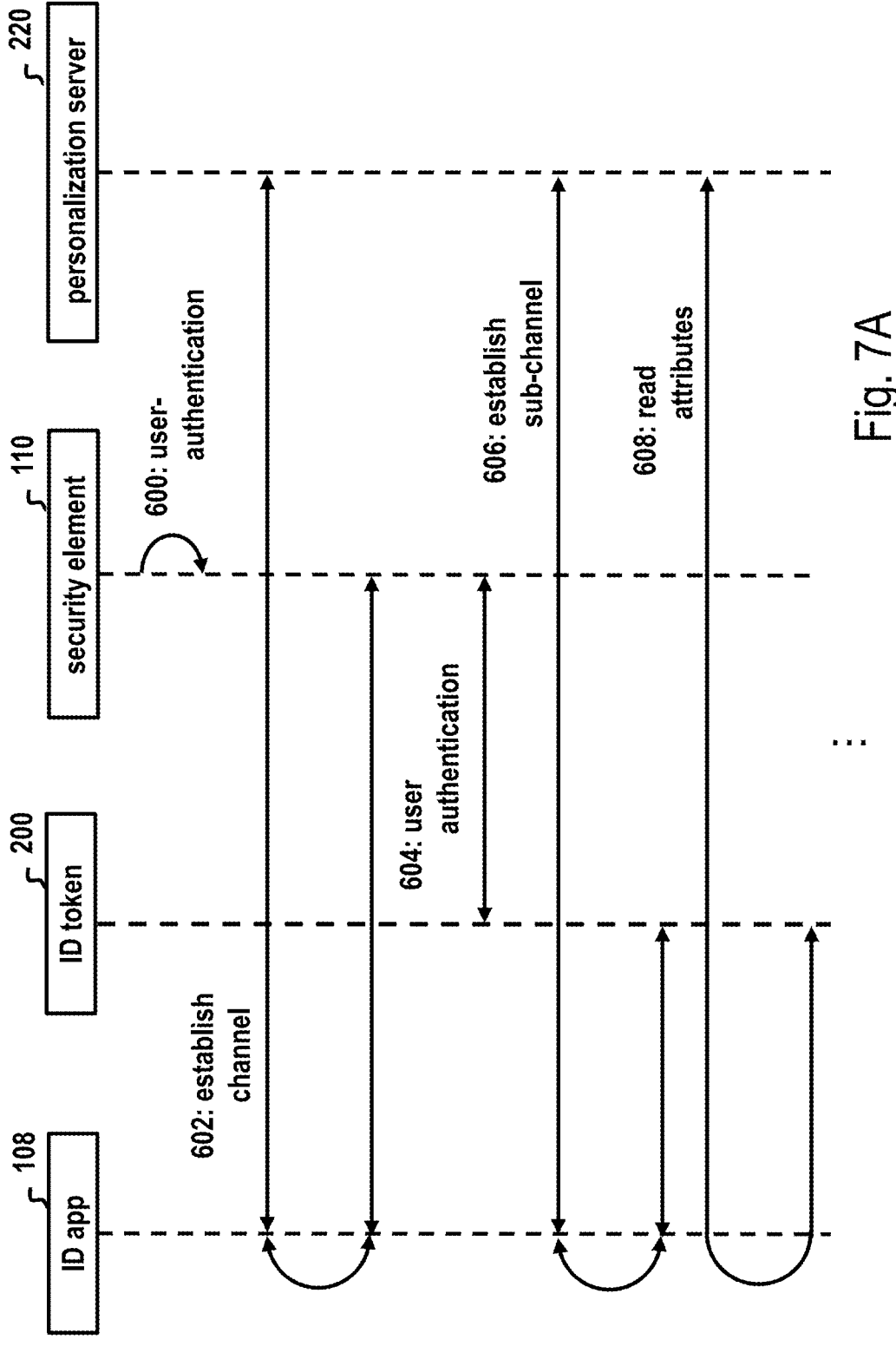
Figure 7B:
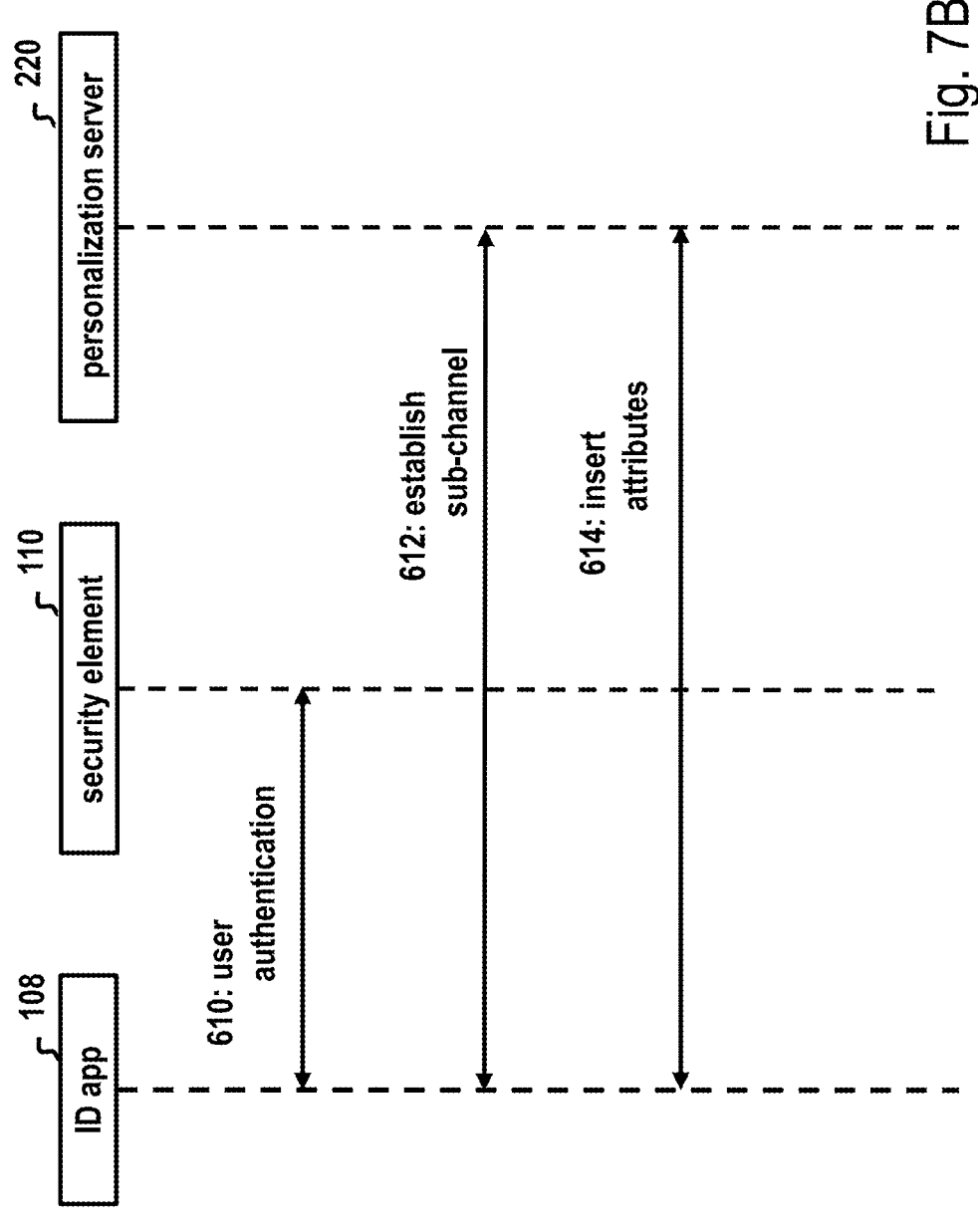
Figure 8:
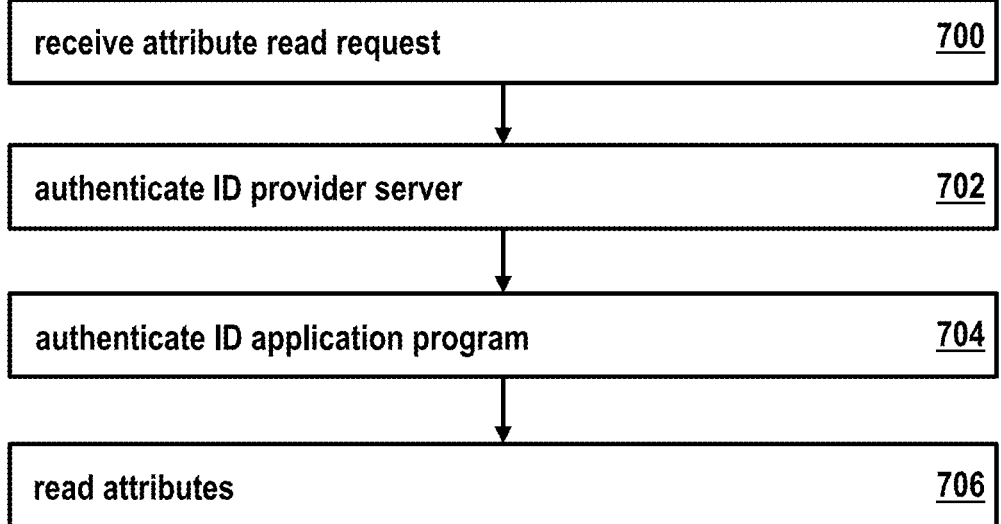
Figure 9:
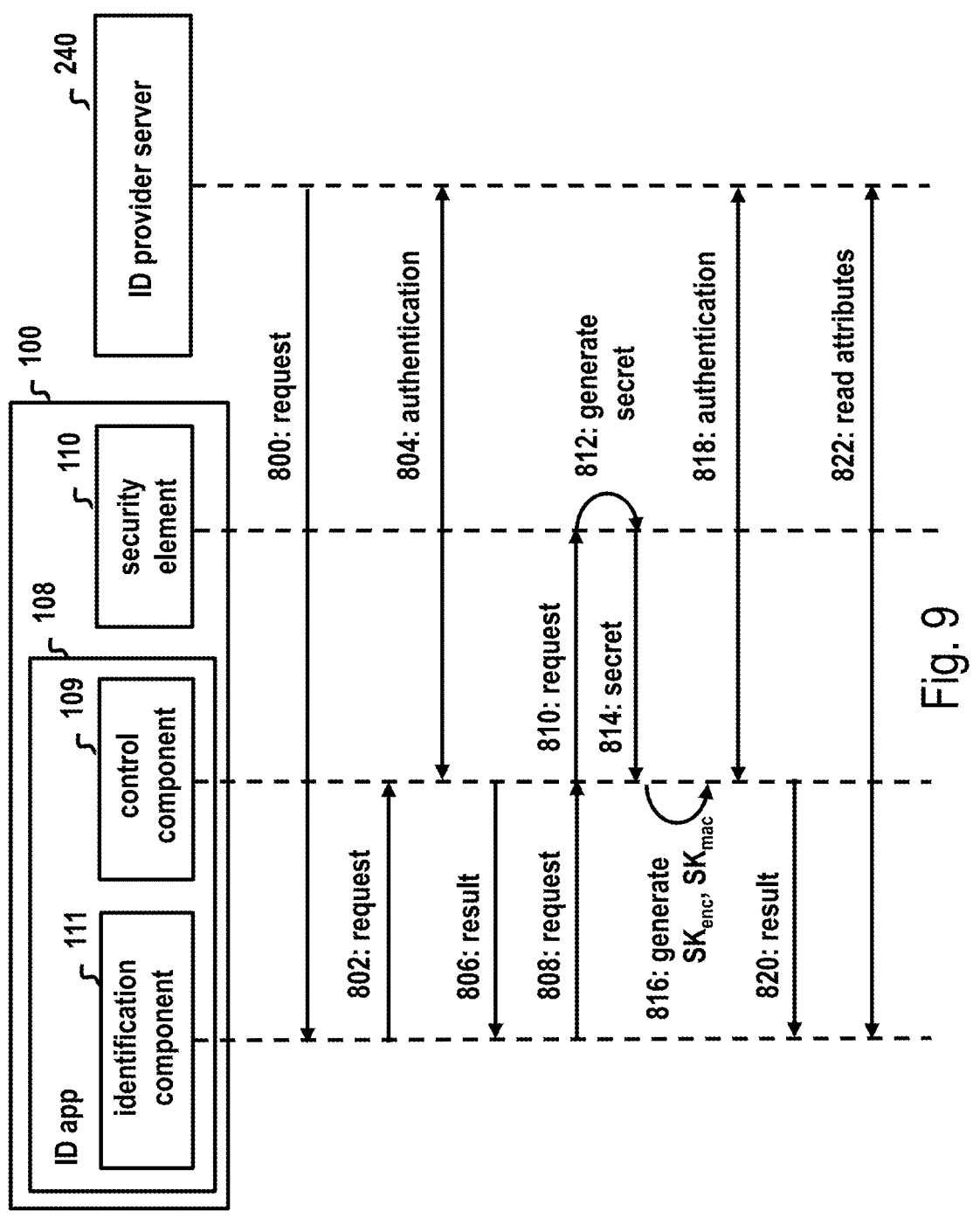

FIG. 3 shows a flowchart of an exemplary method for provisioning an ID application program on the mobile device, FIG. 4 shows a flowchart of an exemplary method for provisioning the ID application program on the mobile device, FIG. 5 shows a flowchart of an exemplary method for personalizing the ID application program on the mobile device, FIG. 6 shows a schematic diagram of exemplary encrypted channels, FIG. 7 shows a flowchart of an exemplary method for personalizing the ID application program on the mobile device, FIG. 8 shows a flowchart of an exemplary method for reading attributes from the mobile device, and FIG. 9 shows a flowchart of an exemplary method for reading attributes from the mobile device.

Elements of the following embodiments that correspond to each other are identified with the same reference signs.

Figure 1:
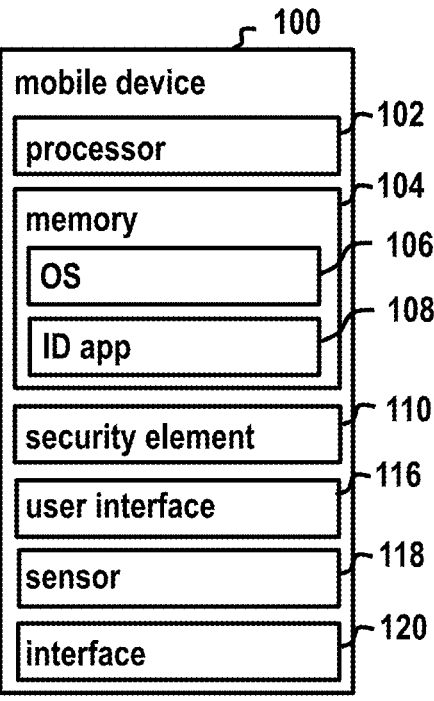
FIG. 1 shows a schematic diagram of an exemplary mobile device.

FIG. 1 shows an exemplary mobile device 100, for example a smartphone, which comprises a memory 104 with program instructions which are executed by a processor 102. The program instructions may include, for example, an operating system 106 installed on the mobile device 100 and an ID application program 108. The ID application program 108 is configured to manage attributes or identity attributes of a user in a personalized state. These attributes form an electronic identity of the user and are provided by the ID application program 108, for example, to prove the identity of the user to another computer system, such as an ID provider server. Furthermore, the ID application program (108 comprises, for example, a control component that controls the creation of the electronic identity by the ID application program 108. In addition, the control component controls, for example, the use of the electronic identity, such as a readout of the attributes of the electronic identity by an ID provider server. Furthermore, the ID application program 108 includes, for example, a provisioning component that controls provisioning of the ID application program 108 with cryptographic keys. Furthermore, the ID application program 108 comprises, for example, a personalization component that controls personalization of the ID application program 108, i.e., the introduction of attributes into the mobile device 100. In particular, the personalization component controls, for example, establishing encrypted channels for communication in the course of corresponding personalization. The corresponding attributes are part of or form an electronic identity of the user managed by the ID application program 108, which the user can use by means of the mobile device 100. Furthermore, the mobile device 100 comprises, for example, a security element 110, which is embedded, for example, as a hardware component in the mobile device 100. The security element 110 is implemented, for example, as a cryptographically secured co-processor with a hardware-based key manager, which enables and provides an additional level of security by isolating it from the main processor 102 of the mobile device. The security element 110 with the co-processor can be used to generate symmetric cryptographic keys and/or asymmetric cryptographic key pairs for the mobile device 100, in particular for the application program 108. The security element 110 provides, for example, identifiers that can be used to identify the generated cryptographic keys. Using the identifiers, the security element 110 may be requested, for example by the ID application program 108, to perform cryptographic operations, such as encryption and/or decryption, on behalf of the ID application program 108 using the cryptographic keys generated for the ID application program 108. For example, the security element 110 may provide a TEE or secure enclave that provides a secure or trusted runtime environment for applications. For example, the security element 110 is assigned to the operating system 106 and provides cryptographic means for the operating system 106, such as cryptographic keys, cryptographic functions and/or cryptographic protocols. For example, the security element 110 provides a key store or key memory for storing cryptographic keys, such as symmetric, public and/or private cryptographic keys, and certificates, such as read certificates, public key certificates and/or attribute certificates. The cryptographic means provided by the security element 110 enable the operating system 106 to execute or participate in a challenge response procedure, for example. Further, the security element 110 provides cryptographic means to the ID application program 108, such as cryptographic keys, cryptographic functions, and/or cryptographic protocols. The cryptographic means provided by security element 110 enable ID application program 108 to execute or participate in, for example, a challenge response process.

Furthermore, the mobile device 100 comprises a user interface 116, which comprises, for example, a display, in particular a touch screen. Using the user interface 116, the user can interact with the mobile device 100. For example, the user can be prompted to provide authenticating factors or authenticating features. To capture authentication data of the authentication factors of the user, the mobile device 100 comprises an authentication sensor 118, which may, for example, be integrated into the user interface 116 or implemented as a stand-alone component. Finally, the mobile device 100 comprises a communication interface or antenna 120, which is configured for wireless communication, for example via a network.

Using the communication interface 120, the mobile device 100 may, for example, communicate with a personalization server for the purpose of provisioning the ID application program 108. Further, the mobile device 100 may communicate with the personalization server using the communication interface 120, for example, for the purpose of personalizing the ID application program 108. Further, the communication interface 120 is configured to communicate wirelessly with an ID token, for example, which provides the attributes of the user for the purpose of personalization. For different communication methods, the communication interface 120 comprises, for example, different communication components.

The mobile device 100 with the communication interface 120 can also act as a transceiver to enable communication between the ID token and the personalization server for reading the attributes from the ID token by the personalization server. In doing so, the mobile device 100 establishes an encrypted communication channel to the personalization server via a network using the security element 110. The corresponding communication channel is encrypted, for example using end-to-end encryption. Within the encrypted communication channel, a first encrypted sub-channel is established between the ID token and the personalization server by means of the mobile device 100 or a personalization component of the ID application program 108. The corresponding first sub-channel is also encrypted using end-to-end encryption, for example. This first encrypted sub-channel is used, for example, for communication between the ID token and the personalization server, for example for reading the attributes provided by the ID token by the personalization server. Furthermore, a second encrypted sub-channel can be established within the encrypted communication channel between the ID application program 108 to be personalized and the personalization server. Establishing the second sub-channel is, for example, also encrypted using end-to-end encryption. This second encrypted sub-channel is used, for example, for communication between the ID application program 108, such as the personalization component of the ID application program 108 and the personalization server, for example for personalizing the ID application program 108 with the attributes read from the ID token by the personalization server.

Figure 2A:
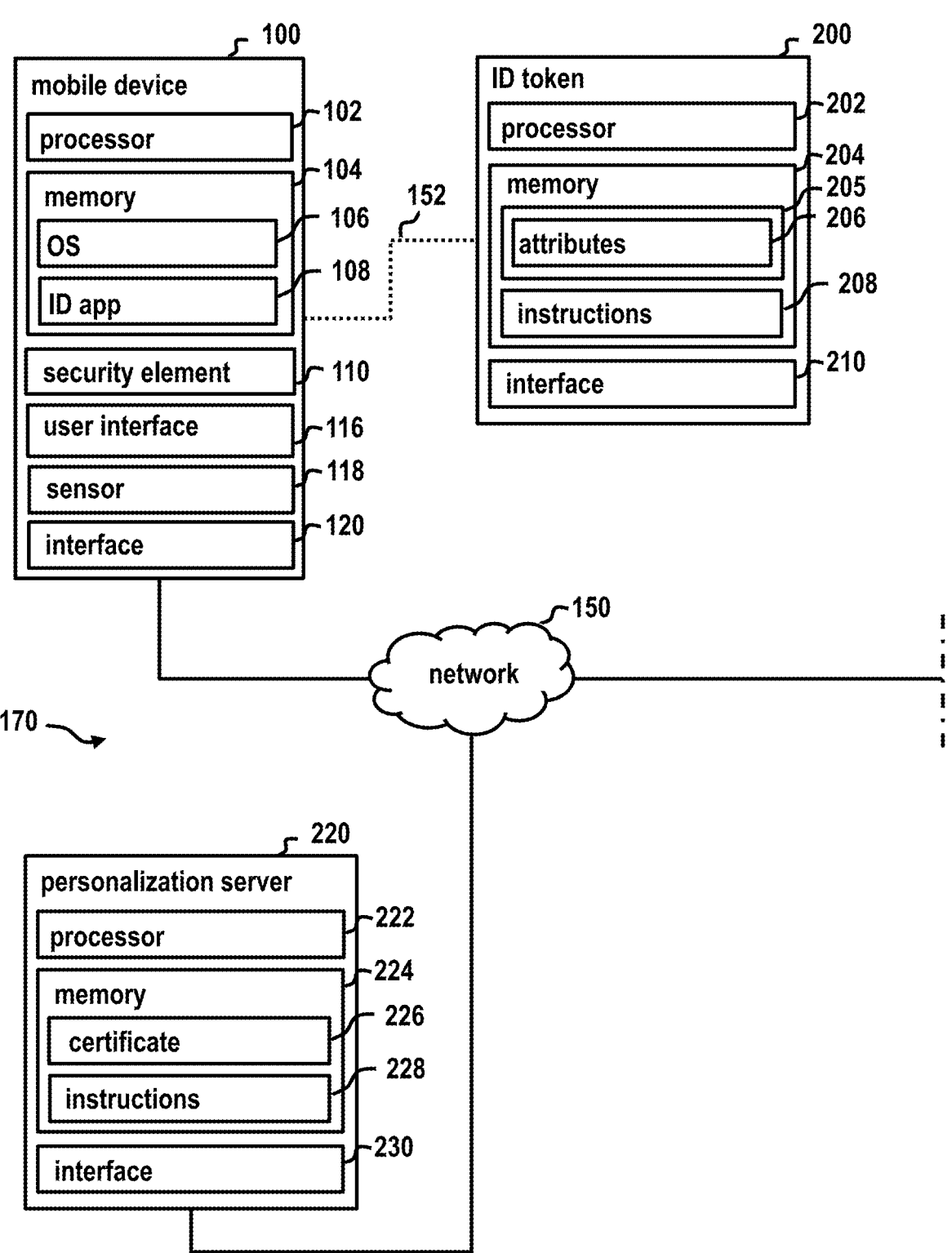
FIG. 2 shows a schematic diagram of an exemplary system.
Figure 2B:
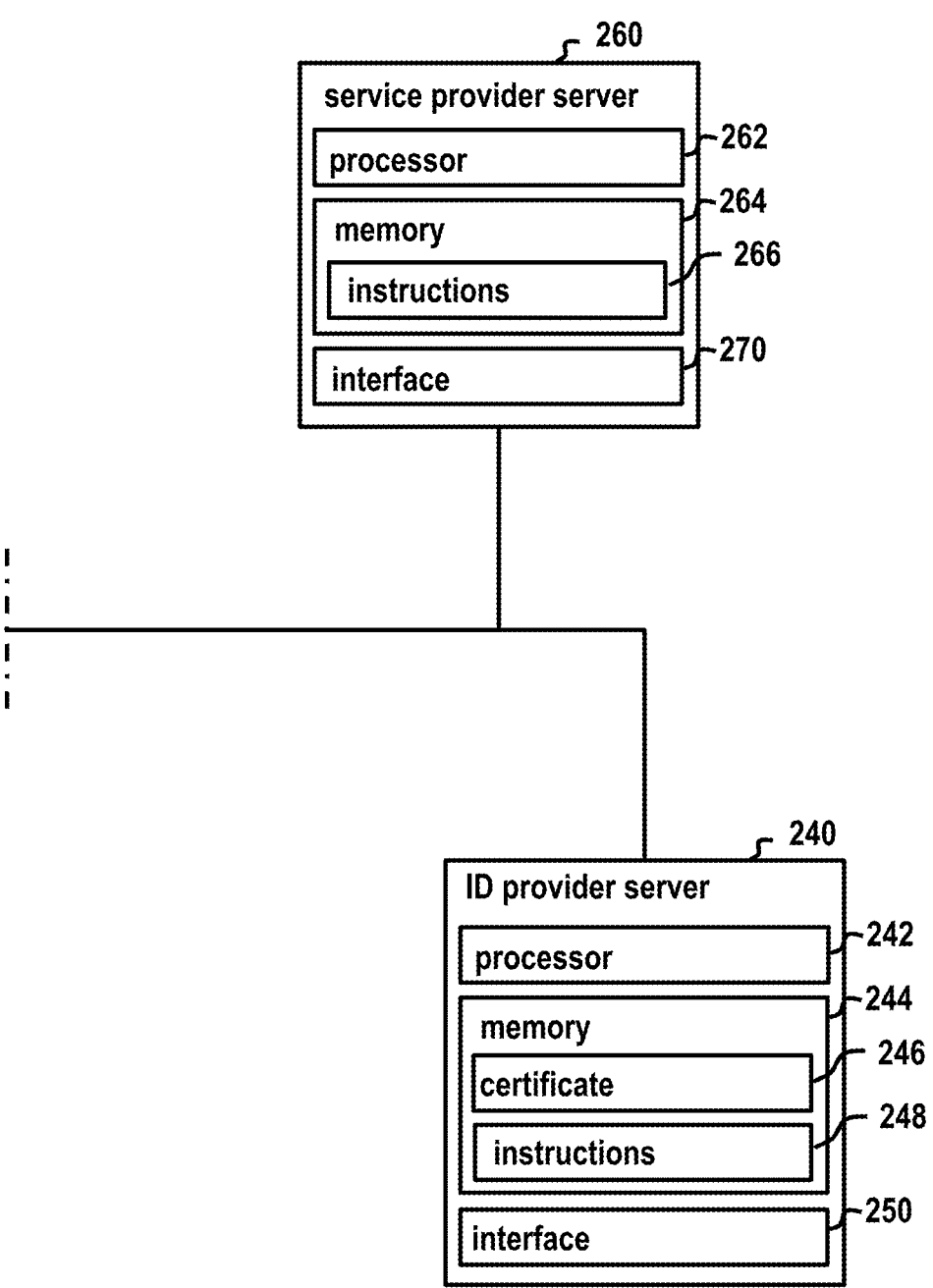

FIG. 2 shows an exemplary system 170 comprising a mobile device 100 connected to a personalization server 220 via a network 150, such as the Internet. In addition, the mobile device 100 may communicate via the network 150 with, for example, an ID provider server 240 and/or a service provider server 260. Furthermore, the mobile device 100 can be connected to an ID token 200, for example, via a wireless direct communication link 152. The mobile device 100 is established, for example, as described in FIG. 1 and has the corresponding functionalities.

The personalization server 220 is configured, for example, to be used in the course of provisioning the mobile device 100 or the ID application program 108. The personalization server 220 includes a processor 222, a memory 224, and a communication interface 230. Program instructions 228 are stored in the memory 204, and when executed, the processor 222 causes the personalization server 220 to perform an external security inspection, for example. For example, a control component of the ID application program 108 sends a security inspection request to the personalization server 220, for example, to perform an external security inspection or a remote security inspection. The security inspection request is initiated, for example, by a provisioning component of the ID application program 108. This security inspection request is sent, for example, to the personalization server 220 via the control component. The control component records, for example, test parameters of the security infrastructure of the mobile device 100, which the personalization server 220 evaluates in the course of the external security inspection. The personalization server 220 sends the result of the remote security inspection to the control component of the ID application program 108, which forwards it to the provisioning component of the ID application program 108. The security inspection comprises, for example, checking the software and/or hardware of the mobile device 100, for example, checking the mobile device 100 for tampering, modifications and/or security vulnerabilities. The integrity of the mobile device 100 can be validated to ensure that the mobile device 100 is not compromised and provides a secure environment for creating an electronic identity. In particular, for example, it can be checked whether the security infrastructure, such as the security element 110 and the security functions implemented by it, such as encryption and/or access restrictions, of the mobile device 100 fulfills a predefined set of security requirements. Upon a positive result of the remote security inspection, the provisioning component starts the actual provisioning.

In the course of provisioning, the security element 110 generates, for example, two asymmetric key pairs for the ID application program 108 at the request of the provisioning component of the ID application program 108 and provides the provisioning component with two public cryptographic keys of the two asymmetric key pairs for further use. The associated private cryptographic keys are not issued by the security element 110, for example, but are used by the security element on behalf of the ID application program 108 at the request of the ID application program 108. For example, successful user authentication of a registered user of the mobile device 100 by the security element 110 is a necessary prerequisite for the generation of one and/or both asymmetric key pairs of the ID application program 108. For example, a binding between the registered user and one and/or both asymmetric key pairs can be implemented in this way. For example, the security element 110 is configured such that a use of one and/or both private cryptographic keys of the two asymmetric key pairs of the mobile device requires a successful user authentication of a registered user of the mobile device 100 by the security element 110.

The personalization server 220 also provides, for example, a certificate comprising a first public cryptographic key of a first asymmetric key pair of the two asymmetric key pairs generated in the course of provisioning. For this purpose, the mobile device 100 or the ID application program 108 sends the first public cryptographic key to the personalization server 220. A prerequisite for issuing the certificate is, for example, a key attestation, which certifies that the first public cryptographic key was generated in compliance with a predefined set of security requirements and/or that the security element 110 generating the first public cryptographic key meets the predefined set of security requirements. With a certificate request, the mobile device 100 sends, for example, attestation information about the first public cryptographic key to the personalization server 220 for verification. The attestation information proves, for example, which security requirements were met by the security element 110 in the course of generating the first asymmetric key pair. Furthermore, in the course of provisioning, for example, the second public cryptographic key is also sent from the mobile device 100 or the ID application program 108 to the personalization server 220. Furthermore, the mobile device 100 sends, for example, attestation information about the second public cryptographic key to the personalization server 220 for verification. The attestation information proves, for example, which security requirements were met by the security element 110 in the course of generating the second asymmetric key pair. Upon successful key attestation by the personalization server 220, the two attested public cryptographic keys of the ID application program 108 are stored, for example, on the personalization server 220. For example, the first public cryptographic key is stored in the form of the certificate generated by the personalization server 220. The certificate is sent from the personalization server 220 to the mobile device 100 or the ID application program 108 via the network 150 in response to the certificate request. For example, the personalization server 220 also sends one or more root signature verification keys, such as CVCA keys of a Country Verifying Certificate Authority, i.e., a national certificate authority for verification, to the mobile device 100 or the ID application program 108. These root signature verification keys are used to verify certificate signatures of one or more root instances. Furthermore, the personalization server 220 sends, for example, the results of the key attestations to the mobile device 100 or the ID application program 108.

To personalize the ID application program 108, attributes 206 are used, for example, which are provided by an ID token 200. The ID token 200 comprises a processor 202 and a memory 204. The attributes 206, which are identity attributes of the holder of the ID token 200, are stored in a protected memory area 205 of the memory 204. Furthermore, program instructions 208 are stored in the memory 204, the execution of which by the processor 202 causes the processor to enable the attributes 206 to be read by an authorized instance, such as the personalization server 220. For this purpose, the ID token 200 establishes a direct wireless connection 152 with the mobile device 100 using its communication interface 210, for example, via which the personalization server 220 can read the attributes 206.

When executing the program instructions 228 stored in the memory 204 of the personalization server 220, the processor 222 controls the personalization server 220 to establish encrypted channels with the mobile device 100, the ID token 200 via the mobile device 100, and with the ID application program 108 of the mobile device 100. The personalization server 220 uses these channels to read attributes 206 from the ID token 200 and insert the read attributes 206 into the mobile device 100 for use by the ID application program 108 in the course of the personalization process. For example, the personalization server 220 uses corresponding certificates 226 to prove read authorization for the attributes 206 from the ID token 200 and write authorization for writing the read attributes 206 to the mobile device 100.

Furthermore, the system comprises, for example, a service provider server 260. The service provider server 260 comprises a processor 262, a memory 264 and a communication interface 270. Program instructions 268 are stored in the memory 264, during the execution of which the processor 262 controls the service provider server 260 to provide services which can be requested and/or used, for example, by the mobile device 100 via the network 150. Utilization of services of the service provider server 260 requires, for example, provision and/or proof of one or more identity attributes of the user. In response to a request for a service of the service provider server 260 by the mobile device 100, the service provider server 260 sends an identity attribute request for identity attributes of the user of the mobile device 100 to an ID provider server 240. The identity attribute request can be sent by the service provider server 260 to the ID provider server 240, for example, directly or via the mobile device 100.

The ID provider server 240 comprises a processor 242, a memory 244 and a communication interface 250. Program instructions 248 are stored in the memory 244, during the execution of which the processor 242 instructs the service provider server 240 to read the identity attributes specified in the identity attribute request from a memory of the mobile device 100. For this purpose, the ID provider server 240 establishes a cryptographically secured communication channel with the mobile device 100. This one cryptographically secured communication channel may, for example, be an end-to-end encrypted communication channel. For example, this requires mutual authenticating of the ID provider server 240 and the mobile device 100. For read access to the identity attributes, the ID provider server 240 uses an ID application program 108 on the mobile device 100, which manages the identity attributes. The ID provider server 240 verifies read authorization to read the identity attributes specified in the identity attribute request, for example with the read certificate 248. Furthermore, read access by the ID provider server 240 to the identity attributes specified in the identity attribute request requires the consent of the user of the mobile device 100. For this purpose, the user must successfully authenticate himself to the ID application program 108. For example, a display device of the user interface 116 indicates to the user which identity attribute is to be sent to the ID provider server 240 and allows the user to edit this selection. For example, the user can select which of the requested identity attributes are actually sent. Upon successful proof of read authorization and successful user authentication, the approved identity attributes are sent to the ID provider server 240. The ID provider server 240 signs the received identity attributes, for example, and sends them to the service provider server 260.

FIG. 3 shows an exemplary method for provisioning an ID application program installed on a mobile device. The ID application program comprises, for example, a provisioning component that controls provisioning on the mobile device side and a control component configured to control the creation and/or use of the electronic identity managed by the ID application program. The mobile device comprises a security element providing cryptographic functions and/or cryptographic keys. In block 300, in response to a security inspection request from the provisioning component, a remote security inspection of the security infrastructure of the mobile device is performed by a personalization server over a network. The control component of the ID application program is used for this purpose, for example. The control component records, for example, inspection parameters of the security infrastructure of the mobile device and sends them to the personalization server. The personalization server evaluates the received test parameters as part of the external security inspection and sends a result of the remote security inspection to the control component of the ID application program, which forwards it to the provisioning component. The security inspection includes, for example, checking the software and/or hardware of the mobile device. For example, the mobile device can be checked for manipulations, modifications and/or security vulnerabilities. The integrity of the mobile device can be validated to ensure that the mobile device is not compromised and provides a secure environment for creating an electronic identity. In particular, it can be checked, for example, whether the security infrastructure, such as the security element and the security functions implemented by it, such as encryption and/or access restrictions, of the mobile device fulfills a predefined set of security requirements. Upon a positive result of the remote security inspection, the provisioning component starts the actual provisioning. In block 302, the provisioning component sends a key generation request to the control component. The control component then requests the security element to generate a first asymmetric key pair for the ID application program. The control component also requests the security element to generate a second asymmetric key pair for the ID application program. In response to the key generation requests, the security element generates two asymmetric key pairs for the ID application program. The security element generates a first asymmetric key pair associated with the ID application program and a second asymmetric key pair associated with the ID application program. The first asymmetric key pair comprises a first private cryptographic key and a first public cryptographic key. Similarly, the second asymmetric key pair comprises a second private cryptographic key and a second public cryptographic key. The mobile device further comprises one or more authentication sensors for detecting one or more authentication factors of a user of the mobile device. A prerequisite for generating the first asymmetric key pair in block 302 is, for example, successful authentication of the user to the security element. With the authentication, the user agrees to the generation of the first asymmetric key pair. At the same time, the use of a first private cryptographic key of the first asymmetric key pair is bound, for example, to a successful authentication of the user and thus the user of the mobile device. In block 304, the control component receives the public cryptographic keys of the requested key pairs from the security element. These public cryptographic keys are forwarded by the control component to the provisioning component.

In block 306, in response to a certificate issuance request sent to a personalization server over a network, the provisioning component receives a certificate of the ID application program issued by the personalization server. This certificate includes the first public crypto-graphic key. This can be an X.509 certificate, for example. For example, a prerequisite for generation is successful key attestation. For example, the provisioning component sends the two public cryptographic keys of the ID application program and attestation information on the two public cryptographic keys to the personalization server for verification with the certificate issue request. The attestation information proves, for example, which security requirements were met by the security element during the generation of the two asymmetric key pairs. Upon successful key attestation by the personalization server, the two attested public cryptographic keys of the ID application program are stored on the personalization server, for example. For example, the first public cryptographic key is stored in the form of the certificate generated by the personalization server. Together with the certificate of the ID application program, the personalization server also sends, for example, one or more root signature verification keys, such as CVCA keys of a Country Verifying Certificate Authority, i.e., a national certificate authority for verification, to the provisioning component. These root signature verification keys are used to verify certificate signatures of one or more root instances. Furthermore, the personalization server sends, for example, the results of the key attestations to the provisioning component of the ID application program.

FIG. 4 shows an exemplary method for provisioning an ID application, program 108 installed on a mobile device 100 with cryptographic keys. The ID application program 108 comprises, for example, a provisioning component 107 for controlling provisioning on the side of the mobile device and a control component 109 for controlling the creation and/or use of the electronic identities managed by the ID application program 108. For example, the provisioning component 107 is configured to perform an initial compatibility check in which it is checked whether the mobile device 100 includes the system components necessary to perform the provisioning and/or the further procedure. The necessary system components include, for example, security element 110 and communication interfaces, for example for communication with the external personalization server 220. In step 400, a request for a security inspection of the security infrastructure of the mobile device 100 is sent from the provisioning component 107 to the control component 109. In step 402, the control component 109 sends a security inspection request to the personalization server 220 to perform a remote security inspection. In step 404, the personalization server 220 performs a remote security inspection. The security inspection comprises, for example, checking the software and/or hardware of the mobile device 100, for example, checking the mobile device 100 for tampering, modifications and/or security vulnerabilities. The integrity of the mobile device 100 can be validated to ensure that the mobile device 100 is not compromised and provides a secure environment for creating an electronic identity. In particular, for example, it can be checked whether the security infrastructure, such as the security element and the security functions implemented by it, such as encryption and/or access restrictions, of the mobile device 100 fulfills a predefined set of security requirements. For example, the control component 109 captures inspection parameters of the security infrastructure of the mobile device 100 and sends them to the personalization server 220. The personalization server 220 evaluates the received inspection parameters in the course of the remote security inspection and sends a result of the remote security inspection in step 406 to the control component 109 of the ID application program 108, which forwards the result to the provisioning component 107 in step 408.

In response to a positive result of the remote security inspection, the provisioning component 107 sends a key generation request to the control component 109 in step 410 to generate two asymmetric key pairs for the ID application program 108. For example, in step 412, the control component 109 requests a first asymmetric key pair for the ID application program 108 from the security element 110. In step 414, the security element 110 generates a first asymmetric key pair associated with the ID application program 108 comprising a first public cryptographic key PuKApp and a first private cryptographic key PrKApp. The mobile device 100 further comprises, for example, one or more authentication sensors for detecting one or more authentication factors of a user of the mobile device 100. A prerequisite for the generation of the first asymmetric key pair PuKApp, PrKApp in step 414 is, for example, successful authentication of the user to the security element 110. With the authentication, the user agrees to the generation of the first asymmetric key pair. At the same time, use of a first private cryptographic key PrKApp of the first asymmetric key pair is bound, for example, to successful authentication of the user and thus the user of the mobile device 100. The first asymmetric key pair is therefore used, for example, to confirm a user authentication of a user of the mobile device 100 by the security element 110 or an approval of the user of the mobile device 100 in the course of using the ID application program 108. In step 416, the security element 110 sends the first public cryptographic key PuKApp of the first asymmetric key pair to the control component 109.

In step 418, the control component 109 requests from the security element 110, for example, a second asymmetric key pair for the ID application program 108. In step 420, the security element 110 generates a second asymmetric key pair associated with the ID application program 108 having a second public cryptographic key PuKCA and a first private cryptographic key PrKCA. The second asymmetric key pair serves, for example, as the asymmetric key pair of the ID application program 108 for authenticating the ID application program 108 to other computer systems, such as to the personalization server 220. In step 422, the security element 110 sends the second public cryptographic key PuKCA of the second asymmetric key pair to the control component 109. In step 424, the control component forwards the two public cryptographic keys PuKApp, PuKCA received from the security element 110 to the provisioning component 107.

In step 426, the provisioning component 107 of the ID application program 108 sends a certificate issuance request to the personalization server 220 via a network to issue a certificate with the first public cryptographic key PuKApp. Communication with the personalization server 220 takes place, for example, via an encrypted communication connection, such as an HTTPS connection. The certificate issuance request comprises, for example, the first public cryptographic key PuKApp and attestation information about the first public cryptographic key PuKApp. The attestation information certifies that the first public cryptographic key PuKApp was created in compliance with a predefined set of security requirements and/or that the security element 110 creating the first public cryptographic key PuKApp fulfills the predefined set of security requirements. In addition, the provisioning component 107 sends, for example, the second public cryptographic key PuKCA and attestation information about the second public cryptographic key PuKCA to the personalization server 220. The attestation information about the second public cryptographic key PuKCA certifies that the second public cryptographic key PuKCA was created in compliance with a predefined set of security requirements and/or that the security element 110 creating the second public cryptographic key PuKCA meets the predefined set of security requirements. In step 428, the personalization server 220 checks the attestation information for the first public cryptographic key PuKApp and, upon a successful check, generates a certificate CertApp for the ID application program 108 with the first public cryptographic key PuKApp. The CertApp certificate is, for example, an X.509 certificate. The CertApp certificate is stored by the personalization server 220. Further, the personalization server 220 checks the attestation information for the second public cryptographic key PuKCA and, upon a successful check, stores the second public cryptographic key PuKCA together with the certificate CertApp. In step 430, the personalization server 220 sends the certificate CertApp to the provisioning component 107. Furthermore, the personalization server 220 sends, for example, the results of the verification of the attestation information for the two public cryptographic keys PuKApp, PuKCA to the provisioning component 107. In addition, the personalization server 220 sends, for example, a root signature verification key, such as a CVCA key of a Country Verifying Certificate Authority, i.e., a national certificate authority. The root signature verification key of the root certificate CertRoot can be used, for example, to verify signatures, in particular certificate signatures, of a root instance to which the root certificate CertRoot is assigned. Finally, in step 432, the root certificate CertRoot is forwarded from the provisioning component 107 to the control component 109 for storage. In addition, the method may comprise validating the received certificate CertApp, wherein the ID application program 108 and/or the provisioning component 107 of the ID application program 108 authenticates itself to the personalization server 220 using the certificate CertApp and/or the first public cryptographic key PuKApp comprised by the certificate CertApp. In the course of this authentication, the provisioning component 107 sends, for example, a signature created using the first private cryptographic key PrKApp, such as a response to a challenge from the personalization server 220, to the personalization server 220. A signature with the first private cryptographic key PrKApp is created, for example, by the security element 110 for the provisioning component 107, possibly with the mediation of the control component 109.

FIG. 5 shows an exemplary method for personalizing an ID application program. The ID application program to be personalized is installed on a mobile device with a security element. The personalization is carried out using an ID token, on which attributes of a user are stored, and a personalization server, which has authorization to read the attributes from the ID token and to insert the read attributes into the mobile device for the purpose of personalizing the ID application program or creating an electronic identity managed by the ID application program. The personalization server verifies the corresponding authorizations using a certificate and/or the possession and use of certain cryptographic keys.

In block 500, personalization comprises establishing an encrypted communication channel between the mobile device and the personalization server via a network. Here, for example, the ID application program or a personalization component of the ID application program is used, which controls the establishing. In the course of the setup, for example, the mobile device and personalization server are mutually authenticated, for example using challenge-response methods. Furthermore, for example, a first channel-specific ephemeral symmetric cryptographic session key is negotiated to encrypt the communication channel between the mobile device and the personalization server.

In block 502, a first encrypted sub-channel is established between the ID token and the personalization server within the encrypted communication channel via the mobile device. Here, for example, the ID application program or a personalization component of the ID application program is used to control the setup. In the course of the setup, for example, the ID token and personalization server are mutually authenticated, for example using challenge-response methods. Furthermore, for example, a second channel-specific ephemeral symmetric cryptographic session key for encrypting the first sub-channel is negotiated between the ID token and the personalization server. In block 504, one or more of the attributes are read from the ID token by the personalization server via the first encrypted sub-channel within the encrypted communication channel.

Furthermore, in block 506, a second encrypted sub-channel is established between the control component of the ID application program and the personalization server within the encrypted communication channel. Here, for example, the personalization component of the ID application program is used to control the setup. In the course of the setup, for example, mutual authentication of the ID application program or the control component of the ID application program and the personalization server takes place, for example using challenge-response methods. Furthermore, for example, a third channel-specific ephemeral symmetric cryptographic site key for encrypting the second sub-channel is negotiated between the control component and the personalization server.

In block 508, the control component receives the read attributes from the personalization server via the second encrypted sub-channel within the encrypted communication channel. The attributes are, for example, introduced into the mobile device as a CBOR structure. Further cryptographic elements, such as root signature verification keys, can also be transmitted via the second encrypted sub-channel. The root signature verification keys are CVCA keys, for example. These other cryptographic elements can also be part of the CBOR structure with the attributes, for example. Furthermore, the second encrypted sub-channel can be used to initiate the generation of attribute-specific and thus identity-specific cryptographic keys on the security element, which are assigned to the derived electronic identity of the user of the mobile device stored on the mobile device in the course of personalization. For example, a third asymmetric cryptographic key pain is generated by the security element, which is assigned to the inserted attributes or the created identity. For example, the third public cryptographic key is stored together with attributes or with the electronic identity. This public cryptographic key can be used, for example, to verify attribute-specific or identity-specific signatures created with the third public cryptographic key as a signature key.

In block 510, the control component stores the received attributes, with which the ID application program is assigned or personalized to the corresponding user. For example, the attributes are stored in encrypted form on the mobile device for use by the ID application program, possibly using the security element. The ID application program is configured to use the stored attributes to prove the electronic identity of the corresponding user to another computer system, such as an ID provider server.

FIG. 6 shows exemplary encrypted channels 160, 162, 164, which are established on the mobile device 100 in the course of the personalization of the ID application program 108. An encrypted communication channel 160 is established between the mobile device 100 and the personalization server 220. This serves to secure the communication between the mobile device 100 and the personalization server 220. At the same time, the mobile device 100 is bound to the personalization server 220 during the communication. The personalization server 220 can thus ensure that all communication via the encrypted communication channel 160 takes place via the same mobile device 100. For example, the same mobile device 100 is used to read attributes from the ID token, which is subsequently personalized with the read attributes.

In the course of further personalization, communication between the mobile device 100 and the personalization server 220 takes place via the encrypted communication channel 160. This also includes communication between the personalization server 220 and the ID token 200, which is carried out via the mobile device 100. The encrypted communication channel 160 is encrypted, for example, using end-to-end encryption. The communication is encrypted and decrypted on the mobile device 100, for example by means of the security element of the operating system of the mobile device 100. Within the encrypted communication channel 160, a first encrypted sub-channel 162 is also established between the ID token 200 and the personalization server 220 via the mobile device 100 or a personalization component of the ID application program. This first encrypted sub-channel 162 is used, for example, for communication between the ID token 200 and the personalization server 220, for example for reading the attributes provided by the ID token 200 by the personalization server 220. The corresponding first sub-channel 162 is also encrypted, for example, using end-to-end encryption. The data transmission between mobile device 100 and personalization server 220 takes place, for example, via a network, while the data transmission between mobile device 100 and ID token 200 takes place, for example, via a direct radio connection.

In this context, sub-channel means that data to be transmitted via the corresponding sub-channel is first encrypted using a cryptographic session key of the corresponding sub-channel. For example, a MAC of the data is additionally generated using a cryptographic authentication key of the corresponding sub-channel and transmitted together with the encrypted data. In addition, the data to be transmitted is encrypted using a further cryptographic session key of the communication channel, which is superordinate to the sub-channel. For example, a further MAC of the data is generated using a further cryptographic authentication key of the corresponding communication channel and transmitted together with the encrypted data. If the transmitted data reaches the end of the communication channel, the encryption of the communication channel is decrypted first. If the transmitted data then reaches the end of the sub-channel, the encryption of the sub-channel is also decrypted. Transmission via an encrypted sub-channel within an encrypted communication channel therefore involves double encryption with two independent session keys. The session keys are independent in the sense that access to one of the two session keys does not automatically result in access to the other session key.

Within the encrypted communication channel 160, a second encrypted sub-channel 164 is further established between the ID application program 108 of the mobile device 100 and the personalization server 220, mediated by the personalization component of the ID application program. The corresponding second sub-channel 164 is also encrypted using end-to-end encryption, for example. This second encrypted sub-channel 164 is used, for example, for communication between the ID application program 108, for example a control component of the ID application program 108, and the personalization server 220, for example for personalizing the ID application program 108 with the attributes read from the ID token 200 by the personalization server 220.

FIG. 7 shows an exemplary method for personalizing an ID application program 108 on a mobile device. First, a user of the mobile device authenticates himself in step 600 to a security element 110 of the mobile device 100 configured for this purpose. For example, reference values for one or more authenticating factors, such as biometric features or a PIN, of a user registered on the mobile device are stored in the security element 110. In the course of user authentication, one or more authentication factors of the user are recorded and compared with the reference values. In the event of a match, the user is considered successfully authenticated, for example. In step 602, an encrypted communication channel is established between the mobile device, for example the security element 110, and the personalization server 220. This includes, for example, mutually authenticating the mobile device or security element 110 and personalization server 220, for example by means of a challenge-response method, and negotiating a cryptographic key, for example a channel-specific ephemeral symmetric cryptographic session key, to encrypt the communication channel.

For example, a first initial random value is first generated by the mobile device or the security element 110 and sent to the personalization server 220. After receiving the corresponding first initial random value, the personalization server 220 generates a second initial random value, which it sends to the mobile device. Thus, both participants, the mobile device and the personalization server 220, have both initial random values. Furthermore, the personalization server 220 sends, for example, its certificate to the mobile device and receives a certificate of the mobile device from the mobile device after a successful check of the corresponding certificate. The certificate of the mobile device may, for example, be a certificate assigned to the ID application program, such as a certificate created by the personalization server 220 for the ID application program in the course of provisioning. The certificate of the mobile device received by the personalization server 220 is also verified. The two certificates each comprise a public cryptographic key, i.e., the certificate of the personalization server 220 comprises a public cryptographic key of an asymmetric key pair of the personalization server 220 and the certificate of the mobile device comprises a public cryptographic key of an asymmetric key pair of the mobile device. Thus, both participants now each have public cryptographic keys of the other party, the authenticity of which is proven by a certificate. The mobile device then generates the first random value, for example, which it sends to the personalization server 220. Thus, both participants in the communication now each have three random values from which, for example, the channel-specific ephemeral symmetric cryptographic session key can be calculated. Furthermore, the mobile device sends, for example, a signature of one, several or all previous messages exchanged in the course of establishing the channel to the personalization server 220. By verifying the corresponding signature using the public cryptographic key provided by the certificate of the mobile device as a signature verification key, the personalization server 220 can authenticate the mobile device and/or the ID application program. If the personalization server 220 subsequently sends a message encrypted with the first channel-specific symmetric cryptographic session key to the mobile device, this also authenticates the personalization server 220 with respect to the mobile device. The personalization server 220 can only calculate the first channel-specific ephemeral symmetric cryptographic session key if it has a private cryptographic key with which it can decrypt the first random value received from the mobile device. Thus, only the personalization server 220 in possession of the corresponding private cryptographic key, to which the certificate of the personalization server 220 is assigned, is capable of encrypted communication via the encrypted communication channel.

To enable the establishing of a first encrypted sub-channel, in step 604 the user of the mobile device is authenticated by the ID token 200 using the mobile device or the security element 110. For example, the user is authenticated to the ID token 200 using the mobile device. For example, an ephemeral symmetric cryptographic key is derived using the captured authentication factor of the user. The mobile device receives a random value from the ID token 200, which is encrypted with the same ephemeral symmetric cryptographic key. The ID token 200 derives the corresponding ephemeral symmetric cryptographic key, for example, from a reference value for the authentication factor or the correspondingly derived ephemeral symmetric cryptographic key is stored on the ID token 200. If the mobile device is able to correctly decrypt the received encrypted random value, this constitutes proof that the mobile device has the correct authentication factor. The mobile device generates an ephemeral asymmetric key pair, the public cryptographic key of which the mobile device sends to the ID token 200. In return, the mobile device receives the public cryptographic key of the ID token 200. At this point in the method, therefore, no static cryptographic keys are required; instead, only randomly generated ephemeral asymmetric key pairs can be used. The mobile device generates a secret shared with the ID token 200 using the decrypted random value, the ephemeral private cryptographic key of the ID application program and the ephemeral public cryptographic key of the ID token 200. The ID token 200 is also capable of calculating the corresponding secret using the random value generated by it, the ephemeral private cryptographic key of the ID token 200 and the ephemeral public cryptographic key of the mobile device received from the mobile device.

The mobile device can now use the shared secret generated in this way to calculate a shared authentication key for mutual authentication of the ID application program and ID token 200. For example, the mobile device can generate a first authentication token using the corresponding authentication key and the ephemeral public cryptographic key of the ID token 200. The corresponding authentication token can be sent from the mobile device to the ID token 200, which can verify the received authentication token using the shared authentication key and the ephemeral private cryptographic key of the ID token 200. Thus, the mobile device can authenticate itself to the ID token 200. Similarly, the ID token 200 can send an authentication token to the mobile device. The mobile device receives the authentication token, which is generated, for example, using the shared secret and the ephemeral public cryptographic key of the mobile device. The authentication token can be verified using the authentication key and the public cryptographic key of the ID application program.

In step 606, a first encrypted sub-channel is established upon successful authentication of the user in step 604. The establishing of the first encrypted sub-channel comprises, for example, a mutual authentication of ID token 200 and personalization server 220 and a negotiation of a cryptographic key for encrypting the corresponding sub-channel.

For example, the personalization server 220 is first authenticated by the ID token 200 in a cryptographically secure manner. For this purpose, the ID token 200 receives, for example, a certificate of the personalization server 220, which provides a public cryptographic key of the personalization server 220 for authenticating. The ID token 200 verifies the signature of the received certificate. For example, the corresponding certificate is received as part of a certificate chain, for the verification of which corresponding signature verification keys, in particular root signature verification keys, are stored on the ID token 200. The ID token 200 can thus verify the authenticity of the certificate provided using the certificate chain, for example a PKI. Furthermore, the ID token 200 receives, for example, an ephemeral public cryptographic key of the personalization server 220. For example, the ID token 200 receives the ephemeral public cryptographic key of the personalization server 220 in compressed form. In return for receiving the certificate of the personalization server 220, the ID token 200 generates a random value, which it sends to the personalization server 220 as a challenge via the encrypted communication channel. Using a private cryptographic key, which forms an asymmetric key pair with the public cryptographic key of the previously provided certificate, the personalization server 220 creates a signature of the challenge as a response to the challenge. For example, to generate the response, a data combination is signed which comprises the random value as a challenge and the ephemeral public cryptographic key of the personalization server 220, for example in compressed form. The ID token 200 receives the corresponding signature via the encrypted communication channel and verifies it using the previously received public cryptographic key of the personalization server 220 as a signature verification key. For this purpose, the ID token 200 further uses, for example, the random value previously sent and the ephemeral public cryptographic key of the personalization server 220 previously received as a challenge.

The ID token 200 then authenticates itself to the personalization server 220 in a cryptographically secure manner. For this purpose, the ID token 200 sends a public cryptographic key to the personalization server 220. This is done via the encrypted communication channel. In return, the ID token 200 receives an ephemeral public cryptographic key from the personalization server 220 via the encrypted communication channel. The ID token 200 computes a shared secret with the personalization server 220 using the private cryptographic key of the ID token 200 and the received ephemeral public cryptographic key of the personalization server 220. The personalization server 220 may compute the same shared secret using the public cryptographic key of the ID token 200 and the ephemeral private cryptographic key of the personalization server 220. The ID token 200 generates a random value which it uses to compute a shared authentication key. The authentication key is used to authenticate data sent via the encrypted sub-channel. The ID token 200 generates the corresponding shared authentication key using the random value and the shared secret. Furthermore, the ID token 200 generates an authentication token using the corresponding authentication key and the ephemeral key of the personalization server 220. The authentication token thus generated is sent by the ID token 200 together with the random value to the personalization server 220 in the communication channel. By receiving the random value, the personalization server 220 is also enabled to calculate the authentication key using the shared secret. With this shared authentication key and the ephemeral public cryptographic key of the personalization server 220, the personalization server 220 can verify the received authentication token. If the verification is successful, the ID token 200 is also successfully authenticated to the personalization server 220 and a successful mutual authentication of the ID token 200 and the personalization server 220 is realized. Furthermore, the calculated mutual authentication key can be used to authenticate data that is exchanged between ID token 200 and personalization server 220 via the encrypted sub-channel.

Furthermore, the ID token 200 and the personalization server 220 can each generate the channel-specific ephemeral symmetric cryptographic site key for encrypting the first sub-channel using the shared secret and the random value.

In step 608, the personalization server 220 uses the first encrypted sub-channel thus established between the personalization server 220 and the ID token 200 within the encrypted communication channel between the personalization server 220 and the mobile device or the security element 110 to read the attributes from the ID token 200 via the mobile device.

A second encrypted sub-channel is established between the ID application program 108 and the personalization server 220 for inserting the read attributes. In step 610, for example, the user is authenticated by the security element 110. This authenticating of the user by the security element 110 is, for example, a prerequisite for using the first public cryptographic key of the ID application program 108 in the course of authenticating the ID application program 108 to the personalization server 220, for example in the course of a challenge-response method.

In step 612, a second encrypted sub-channel is established in response to a successful authentication of the user in step 610. For example, the authentication of the user according to step 608 may be part of the channel establishing according to step 610. The establishing of the second encrypted sub-channel comprises, for example, a mutual authentication of ID application program 108 and personalization server 220 as well as a negotiation of a cryptographic key for encrypting the corresponding sub-channel. In the course of authenticating the ID application program 108, for example, user authentication by the security element 110 is necessary.

First, for example, the personalization server 220 is authenticated by a control component of the ID application program 108 in a cryptographically secure manner. For this purpose, the control component of the ID application program 108 to be personalized first receives a certificate of the personalization server 220 via the encrypted communication channel. The corresponding certificate can be verified by the control component. For example, the corresponding certificate is provided as part of a certificate chain, which the control component can verify with stored root signature verification keys. In this way, the control component can verify the authenticity of the certificate provided using the certificate chain, for example a PKI. In return for receiving the certificate from the personalization server, the security element 112 generates a random value and sends the corresponding random value as a challenge to the personalization server 220. In response to sending the random value as a challenge, the security element 112 receives a signature of the challenge as a response from the personalization server 220 via the encrypted communication channel. To create the signature, the private cryptographic key of the personalization server 220 is used, which forms an asymmetric key pair with the public cryptographic key of the previously provided certificate. For example, a data combination is signed to generate the response. The corresponding data combination comprises, for example, the random value previously sent as a challenge and the ephemeral public cryptographic key of the personalization server 220, for example in compressed form. The security element 112 can verify the corresponding signature using the previously received public cryptographic key of the personalization server 220 as a signature verification key. For this purpose, the security element 112 further uses, for example, the ephemeral public cryptographic key of the personalization server 220 and the random value previously sent as a challenge. If the signature check is successful, the personalization server 220 is considered successfully authenticated.

Further, the control component receives and stores an ephemeral public cryptographic key of the personalization server 220. For example, the security element 112 receives the ephemeral public cryptographic key of the personalization server 220 in a compressed form. For example, the security element 112 receives the ephemeral public cryptographic key of the personalization server 220 in uncompressed form.

The ID application program 108 then authenticates itself to the personalization server 220 in a cryptographically secure manner. For this purpose, the corresponding ID application program 108 to be personalized first uses the second private cryptographic key of the second asymmetric key pair stored in the security element. The corresponding second private cryptographic key is generated and stored by the security element 110, for example, in the course of provisioning the ID application program 108. To authenticate the ID application program 108, the ID application program 108 uses, for example, the ephemeral public cryptographic key generated by the personalization server 220 for the purpose of authentication. The ID application program 108 sends the ephemeral public cryptographic key previously received and stored by the control component from the personalization server 220 to the security element 110. The security element 110 computes a shared secret using the second private cryptographic key of the ID application program 108 and the received ephemeral public cryptographic key of the personalization server 220. The security element 110 outputs the shared secret to the control component of the ID application program 108. The control component uses a random value to generate a shared authentication key. The shared secret is also used to generate the corresponding shared authentication key. In addition, the control component of the ID application program 108 generates an authentication token. The control component generates the corresponding authentication token using the previously received ephemeral public cryptographic key of the personalization server 220 and the previously generated shared authentication key. The control component of the ID application program 108 to be personalized sends this authentication token together with the random value to the personalization server 220 via the encrypted communication channel. The personalization server 220 can also first calculate the shared secret. For this purpose, the personalization server 220 uses the second public cryptographic key of the ID application program 108, which is known to the personalization server 220. This was stored on the personalization server 220, for example, in the course of provisioning the ID application program 108. Further, the personalization server 220 uses the ephemeral private cryptographic key of the personalization server 220 to calculate the shared secret. With the corresponding shared secret, the personalization server 220 is able to calculate the shared authentication key. For this purpose, the personalization server 220 uses the received random value and the previously calculated shared secret. Thus, the personalization server 220 can verify the received authentication token using the shared authentication key and the ephemeral public cryptographic key of the personalization server 220.

Further, the control component of the ID application program 108 and the personalization server 220 may each individually generate the channel-specific ephemeral symmetric cryptographic session key for encrypting the second sub-channel using the shared secret and the random value. The thus established second encrypted sub-channel between the personalization server 220 and the ID application program 108 within the encrypted communication channel is used by the personalization server 220 in step 614 to insert the attributes from the ID token 200 into the mobile device for use by the ID application program 108.

FIG. 8 shows an exemplary method for reading attributes of an electronic identity of a user managed by an ID application program on a mobile device by an ID provider server. In the course of using the electronic identity, for example, an encrypted communication channel is first established between the mobile device and the ID provider server. In block 700, the mobile device or the ID application program receives a read request from the ID provider to read one or more attributes of the electronic identity. For example, the read request identifies the attributes to be read. Furthermore, the read request specifies, for example, who is requesting the corresponding attributes, i.e., to whom the ID provider server will forward the corresponding attributes, as well as their intended use. This information, which is provided by the read request, is displayed to the user on a display device of the mobile device, for example, so that the user can check the corresponding information. Furthermore, the user of the mobile device can be offered the option of selecting which of the requested attributes are actually to be provided to the ID provider server and/or selecting further attributes which are additionally to be provided to the ID provider server.

For cryptographically secured reading of the attributes, the ID provider server is authenticated by the ID application program in block 702. Authenticating the ID provider server is done using a challenge-response method, for example. For this purpose, the control component sends a challenge, such as a nonce or a random value, to the ID provider server via the encrypted communication channel. The ID provider server creates a response to the challenge. The response is a signature of the challenge created using a private cryptographic key of an asymmetric key pair of the ID provider server. The ID provider server sends the corresponding response to the mobile device, which receives the response. The control component of the ID application program verifies the received response using a public cryptographic key of the asymmetric key pair of the ID provider server and the sent challenge. During the verification process, the program checks whether the response is actually a signature of the sent challenge using the private cryptographic key of the ID provider server. Furthermore, the mobile device receives, for example, an ephemeral public cryptographic key of an ephemeral cryptographically key pair of the ID provider server. If the verification is successful, i.e., the ID provider server is successfully authenticated by the ID application program, the mobile device stores the received ephemeral public cryptographic key of the ID provider server.

In block 704, the ID application program is authenticated to the ID provider server. To authenticate the ID application program to the ID provider server, a control component of the ID application program uses the security element of the mobile device, which manages the private cryptographic keys of the ID application program. For example, the control component sends a request to the security element to generate a secret shared with the ID provider server using the second private cryptographic key of the ID application program. With the request, the control component provides the security element with, for example, the ephemeral public cryptographic key of the ID provider server. The control component has previously received this ephemeral public cryptographic key of the ID provider server, for example, in the course of authenticating the ID provider server. A prerequisite for using the second private cryptographic key of the ID application program and thus authenticating the ID application program of the mobile device to the ID provider server by the security element is, for example, successful authentication of the user to the security element. By authenticating, the user declares consent for the attributes to be read by the ID provider server.

The security element generates the requested secret using the second private cryptographic key of the ID application program and the ephemeral public cryptographic key of the ID provider server and provides it to the control component. The control component uses the shared secret to generate a shared authentication key for authenticating data that is exchanged with the ID provider server. The corresponding authentication key is, for example, a symmetric cryptographic key. The control component also uses a random value to generate the authentication key. This random value is generated on the mobile end device, for example by the control component. Using the authentication key and the ephemeral public cryptographic key of the ID provider server, the control component generates an authentication token. The authentication key is, for example, a cryptographic key for generating a message authentication code, while the authentication token is a MAC of the ephemeral public cryptographically key of the ID provider server generated using the authentication key.

Further, the control component generates an ephemeral symmetric cryptographic session key using the shared secret and the random value to encrypt the attributes to be read.

The control component sends the authentication token thus generated to the ID provider server together with the random value to authenticate the ID application program to the ID provider server. Using the random value received from the ID application program or from the control component, the ID provider server can also generate the authentication key. The ID provider server calculates the shared secret required for this, for example, using an ephemeral private cryptographic key of the ephemeral asymmetric key pair of the ID provider server and the public cryptographic key of the ID application program. Using the authentication key and its ephemeral public cryptographic key, the ID provider server can check the validity of the received authentication token.

Upon successful mutual authentication, the attributes to be read from the mobile device are read by the ID provider server via the network in block 706. The read request and/or the attributes to be read are encrypted with the generated ephemeral symmetric cryptographic session key. The authentication key is used to generate authentication tokens that prove the authenticity of the read request and/or attributes to be read. The ID provider server can then sign the read attributes, for example, and provide them to a requesting service provider. The corresponding service provider can check the authenticity of the attributes provided to it using the signature of the ID provider server.

FIG. 9 shows an exemplary method for reading attributes of an electronic identity of a user managed by an ID application program 108 on a mobile device 100 by an ID provider server 240. In step 800, ID provider server 240 sends a read request for reading one or more attributes of the electronic identity to an identification component 111 of ID application program 108. The read request is sent, for example, via a previously established encrypted communication channel between mobile device 100 and ID provider server 240. Furthermore, the read request specifies, for example, who is requesting the corresponding attributes, i.e., to whom the ID provider server 240 will forward the corresponding attributes, as well as their intended use. This information provided by the read request is displayed, for example, on a display device of the mobile device 100 for the user so that the user can check the corresponding information. Furthermore, the user of the mobile device may be offered the option of selecting which of the requested attributes are actually to be provided to the ID provider server 240 and/or selecting further attributes that are to be additionally provided to the ID provider server.

In step 802, the identification component 111 sends a request to a control component 109 of the ID application program 108 to initiate authenticating the ID provider server 240. In step 804, the ID provider server 240 is authenticated by the control component 109 of the ID application program 108. Authenticating the ID provider server 240 is done, for example, using a challenge-response method. For this purpose, the control component 109 sends a challenge, such as a nonce or a random value, to the ID provider server 240 via the encrypted communication channel. The ID provider server 240 creates a response to the challenge. The response is a signature of the challenge created using a private cryptographic key of an asymmetric key pair of the ID provider server 240. The ID provider server 240 sends the corresponding response to the mobile device 100, which receives the response. The control component 109 of the ID application program 108 verifies the received response using a public cryptographic key of the asymmetric key pair of the ID provider server 240 and the sent challenge. In the course of the verification, it is checked whether the response is actually a signature of the sent challenge using the private cryptographic key of the ID provider server 240. Furthermore, the mobile device 100 receives, for example, an ephemeral public cryptographic key of an ephemeral cryptographic key pair of the ID provider server 240. If the verification is successful, i.e., the ID provider server 240 is successfully authenticated by the ID application program 108, the mobile device 100 stores the received ephemeral public cryptographic key of the ID provider server 240.

In step 806, the control component 109 sends the result of the authentication of the ID provider server 240 to the identification component 111 of the ID application program 108. If the authentication of the ID provider server 240 was successful, the identification component 111 sends an authentication request to authenticate the application program 108 to the control component 109 in step 808. For authenticating the ID application program 108 to the ID provider server 240, the control component 111 uses the security element 110 of the mobile device 100, which manages the private cryptographically keys of the ID application program 108. In step 810, the control component 111 sends a request to the security element 110 to generate a secret shared with the ID provider server 240 using the second private cryptographic key of the ID application program 108. With the request, for example, the control component 111 provides the security element 110 with, the ephemeral public cryptographic key of the ID provider server 240. The control component 111 has previously received this ephemeral public cryptographic key of the ID provider server 240, for example, in the course of authenticating the ID provider server 240. A prerequisite for using the second private cryptographic key of the ID application program 108 and thus for authenticating the ID application program 108 of the mobile device 100 with respect to the ID provider server 240 by the security element 110 is, for example, successful authentication of the user with respect to the security element 110. With the authentication, the user declares consent to the reading of the attributes to be read by the ID provider server 240.

In step 812, the security element 110 generates the requested secret using the second private cryptographic key of the ID application program 108 and the ephemeral public cryptographic key of the ID provider server 240. In step 814, the security element 110 provides the generated secret to the control component 111. In step 816, the control component 111 uses the shared secret to generate a shared authentication key SKmac for authenticating data exchanged with the ID provider server 240. The corresponding authentication key SKmac is, for example, a symmetric cryptographically encrypted key. The control component 111 also uses a random value to generate the authentication key SKmac. This random value is generated on the mobile device 110, for example by the control component 111. Further, the control component 111 generates an ephemeral symmetric cryptographic session key SKenc using the shared secret and the random value to encrypt the attributes to be read.

In step 818, the control component uses the authentication key SKmac and the ephemeral public cryptographic key of the ID provider server 240 to generate an authentication token.

The authentication key SKmac is, for example, a cryptographic key for generating a message authentication code, while the authentication token is a MAC of the ephemeral public cryptographic key of the ID provider server generated using the authentication key.

The authentication token thus generated is sent by the control component 111 to the ID provider server 240 together with the random value to authenticate the ID application program 108 to the ID provider server 240. Using the random value received from the control component 111, the ID provider server 240 can also generate the authentication key SKmac. The ID provider server 240 calculates the shared secret required for this, for example, using an ephemeral private cryptographic key of the ephemeral asymmetric key pair of the ID provider server 240 and the public cryptographic key of the ID application program 108. Using the authentication key as well as its ephemeral public cryptographic key, the ID provider server 240 can check the received authentication token for validity. Further, the ID provider server 240 may generate the ephemeral symmetric cryptographic session key SKenc using the shared secret and the random value.

In step 820, the control component 109 sends the result of the authentication of the ID application program 108 to the ID provider server 240 to the identification component 111 of the ID application program 108. If the authentication of the ID application program 108 was successful, the attributes to be read are read from the mobile device 100 by the ID provider server 240 in step 822. Here, the read request and/or the attributes to be read are encrypted with the generated ephemeral symmetric cryptographic session key SKenc. The authentication key SKmac is used to generate authentication tokens that prove the authenticity of the read request and/or attributes to be read. For example, the read request is sent in the form of an APDU ("Application Protocol Data Unit").

The ID provider server 240 can, for example, sign the attributes read and provide them to a requesting service provider. The corresponding service provider can check the authenticity of the attributes provided to it using the signature of the ID provider server 240.

REFERENCE SIGNS 100 mobile device
102 processor.
104 memory
106 operating system
107 provisioning component
108 ID application program
109 control component.
110 security element
111 identification component
116 user interface
118 authentication sensor
120 communication interface
150 network
160 encrypted communication channel
162 encrypted sub-channel
164 encrypted sub-channel.
170 system
200 ID token
202 processor
204 memory
205 protected memory area
206 attributes
208 program instructions
210 communication interface
220 personalization server 222 processor
224 memory
226 certificate
228 program instructions
230 communication interface
240 ID provider server
242 processor
244 memory
246 certificate
248 program instructions
250 communication interface
260 service provider server
262 processor
264 memory
266 program instructions
270 communication interface

The invention claimed is:

1. Method for creating a cryptographically secured electronic identity of a user on a mobile device which comprises a security element, wherein an identification (ID) application program for providing the electronic identity is installed on the mobile device, wherein the ID application program on the mobile device is personalized using an ID token, wherein the ID application program comprises a control component for controlling the creation of the electronic identity, wherein the ID application program further comprises a provisioning component for executing a provisioning of the ID application program in the course of the creation of the cryptographically secured electronic identity, wherein the ID application program further comprises a personalization component for personalizing the ID application program, wherein the provisioning of the ID application program comprises:

in response to a security inspection request from the provisioning component, performing a remote security inspection of the security infrastructure of the mobile device using the control component by a personalization server over a network;

receiving a result of the remote security inspection of the personalization server, which the control component forwards to the provisioning component;

upon a positive result of the remote security inspection, sending a key generation request from the provisioning component to the control component, which the control component forwards to the security element;

in response to the key generation request, generating by the security element a first asymmetric key pair associated with the ID application program and a second asymmetric key pair associated with the ID application program, the first asymmetric key pair comprising a first private cryptographic key and a first public cryptographic key, the second asymmetric key pair comprising a second private cryptographic key and a second public cryptographic key, wherein the security element sends the first and second public cryptographic keys to the control component, which forwards the two public cryptographic keys to the provisioning component;

upon receipt of the two public cryptographic keys, generating a certificate request by the provisioning component for generating a certificate of the ID application program comprising the first public cryptographic key, wherein the certificate request comprises the first public cryptographic key;

sending the certificate request by the provisioning component over the network to the personalization server, the certificate request comprising the first public cryptographic key, wherein the provisioning component sends the second public cryptographic key to the personalization server in addition to the certificate request;

in response to the certificate request, receiving the certificate generated by the personalization server with the first public cryptographic key and a root certificate of a root instance of a PKI;

storing the certificate of the ID application program and the root certificate on the mobile device; and wherein the personalizing comprises:

establishing a first encrypted communication channel between the mobile device and the personalization server over the network, wherein the personalization component is used to establish the first encrypted communication channel;

establishing a first encrypted sub-channel between the ID token and the personalization server within the first encrypted communication channel via the mobile device, wherein the personalization component is used to establish the first encrypted sub-channel;

reading one or more of the attributes from the ID token by the personalization server via the first encrypted sub-channel within the first encrypted communication channel;

establishing a second encrypted sub-channel between the control component and the personalization server within the first encrypted communication channel, wherein the personalization component is used to establish the second encrypted sub-channel;

receiving the read attributes by the control component from the personalization server via the second encrypted sub-channel within the first encrypted communication channel, storing the received attributes by the control component on the mobile device, wherein the ID application program is configured to use the attributes to prove an identity of the user to another computer system.

2. Method according to claim 1, wherein the personalization component forwards the root certificate to the control component for storage.

3. Method according to claim 1, the mobile device further comprising one or more authentication sensors for detecting one or more authentication factors of the user, wherein the user is registered on the mobile device and one or more reference values of the registered user are stored in the security element for verifying at least one detected authentication factor of the registered user;

wherein the security element is configured such that a prerequisite for the generation of the first asymmetric key pair is a successful authentication of the user to the security element, wherein the user declares consent to the generation of the first asymmetric key pair with the authentication;

wherein the security element is further configured so that a prerequisite for use of the first private cryptographic key by the security element is in each case a further successful authentication of the user to the security element, wherein the user declares in each case with the further authentications consent to the corresponding use of the first private cryptographic key.

4. Method according to claim 1, wherein the security element is a device-specific security element.

5. Method according to claim 1, wherein the first encrypted communication channel is encrypted with a first channel-specific ephemeral symmetric cryptographic session key, wherein the first encrypted sub-channel is encrypted with a second channel-specific ephemeral symmetric cryptographic session key, wherein the second encrypted sub-channel is encrypted with a third channel-specific ephemeral symmetric cryptographic session key.

6. Method according to claim 1, wherein the personalizing further comprises:

generating, by the security element, a third asymmetric key pair associated with the ID application program, the third asymmetric key pair comprising a third private cryptographic key and a third public cryptographic key, wherein the third asymmetric key pair is for authenticating the ID application program in the course of using the attributes.

7. Method according to claim 1, wherein the personalizing further comprises:

receiving, by the control component, one or more root signature verification keys from the personalization server via the second encrypted sub-channel within the first encrypted communication channel;

storing the received root signature verification keys by the control component on the mobile device, wherein the ID application program is configured to use the root signature verification keys for verifying certificate signatures of one or more root instances having certificates each used in the course of a readout of the attributes for authenticating a readout computer system to the ID application program.

8. Method according to claim 1, wherein the personalizing further comprises:

receiving a signature of the attributes from the personalization server by the control component via the second encrypted sub-channel within the first encrypted communication channel, wherein the signature serves as proof of authenticity of the attributes;

storing the received signature of the attributes by the control component on the mobile device.

9. Method according to claim 5, wherein establishing the first encrypted communication channel comprises negotiating the first channel-specific ephemeral symmetric cryptographic session key, wherein negotiating the first channel-specific ephemeral symmetric cryptographic session key comprises:

generating a first random value by the mobile device;

generating the first channel-specific ephemeral symmetric cryptographic session key using the first random value by the mobile device;

receiving a first certificate of the personalization server with a fourth public cryptographic key of a fourth asymmetric cryptographic key pair of the personalization server by the mobile device from the personalization server;

encrypting the first random value using the received first public cryptographic key of the personalization server by the mobile device;

sending the encrypted first random value to the personalization server by the mobile device for generating the first channel-specific ephemeral symmetric cryptographic session key by the personalization server.

10. Method according to claim 1, wherein establishing the first encrypted sub-channel comprises authenticating the user to the ID token via the mobile device, wherein authenticating the user to the ID token comprises:

receiving, by the personalization component, a further authentication factor of the user detected by one or more authentication sensors;

generating a symmetric cryptographic key using the received further authentication factor;

receiving an encrypted second random value by the personalization component from the ID token, wherein the encrypted second random value is encrypted using the symmetric cryptographic key generated by the ID token using a further reference value of the registered user stored in the ID token for verifying the further authentication factor;

decrypting the received encrypted second random value using the generated symmetric cryptographic key;

generating a first ephemeral asymmetric cryptographic key pair of the ID application program by the security element comprising a first ephemeral private cryptographic key and a first ephemeral public cryptographic key of the ID application program;

sending the first ephemeral public cryptographic key of the ID application program to the ID token;

receiving an ephemeral public cryptographic key of the ID token;

generating a first secret shared with the ID token by the security element using the decrypted second random value, the first ephemeral private cryptographic key of the ID application program and the ephemeral public cryptographic key of the ID token;

receiving the shared first secret by the control component;

generating a first shared authentication key for mutually authenticating the ID application program and the ID token by the control component using the shared first secret;

generating a first authentication token using the first authentication key and the first ephemeral public cryptographic key of the ID token by the control component;

sending the first authentication token generated by the control component to the ID token by the personalization component;

receiving a second authentication token from the ID token by the personalization component, which forwards the second authentication token to the control component, verifying the received second authentication token by the control component using the first authentication key and the first ephemeral public cryptographic key of the ID application program.

11. Method according to claim 1, wherein establishing the first encrypted sub-channel comprises authenticating the personalization server by the ID token via the mobile device, wherein authenticating the personalization server by the ID token comprises:

receiving a second certificate of the personalization server, comprising a second public cryptographic key of a second asymmetric cryptographic key pair of the personalization server, via the first encrypted communication channel, verifying a signature of the received second certificate of the personalization server;

generating a third random value by the ID token;

sending the third random value as a challenge to the personalization server via the first encrypted communication channel;

receiving a first signature of the challenge as a response from the personalization server via the first encrypted communication channel, wherein the challenge is signed using a second private cryptographic key of the personalization server;

verifying the received first signature using the second public cryptographic key of the personalization server and the sent third random value.

12. Method according to claim 1, wherein establishing the first encrypted sub-channel comprises authenticating the ID token (200) to the personalization server via the mobile device, wherein authenticating the ID token to the personalization server comprises:

sending the public cryptographic key of the ID token from the ID token to the personalization server via the first encrypted communication channel;

receiving the a second ephemeral public cryptographic key of the personalization server by the ID token from the personalization server via the first encrypted communication channel;

generating a second secret shared with the personalization server by the ID token using the private cryptographic key of the ID token and the second ephemeral public cryptographic key of the personalization server;

generating a fourth random value by the ID token;

generating a second shared authentication key for authenticating data sent over the first encrypted sub-channel by the ID token, wherein the second shared authentication key is generated using the shared second secret and the fourth random value;

generating a third authentication token by the ID token using the second authentication key and the second ephemeral public cryptographic key of the personalization server to authenticate the ID token to the personalization server;

sending the fourth random value together with the third authentication token for authenticating the ID token by the ID token to the personalization server via the first encrypted communication channel.

13. Method according to claim 1, wherein establishing the second encrypted sub-channel further comprises authenticating the personalization server by the control component, wherein authenticating the personalization server by the control component comprises:

sending a challenge from the control component to the personalization server via the first encrypted communication channel;

receiving a response from the personalization server by the control component, wherein the response is a signature of the challenge created using a third private cryptographic key of a third asymmetric key pair of the personalization server;

receiving a third ephemeral public cryptographic key of the personalization server by the control component;

verifying the received response using a third public cryptographic key of the third asymmetric key pair of the personalization server and the sent challenge;

storing the third ephemeral public cryptographic key of the personalization server by the control component on the mobile device.

14. Method according to claim 1, wherein establishing the second encrypted sub-channel further comprises authenticating the control component to the personalization server, wherein authenticating the ID application program by the control component to the personalization server comprises:

sending, from the control component to the security element, a request to generate a third secret shared with the personalization server, the request comprising a third ephemeral public cryptographic key of the personalization server;

in response to the request, receiving by the control component the shared third secret generated by the security element, wherein the generation of the shared third secret by the security element is performed using the second private cryptographic key of the ID application program and the third ephemeral public cryptographic key of the personalization server;

generating a sixth random value by the control component;

generating a third shared authentication key for authenticating data sent over the second encrypted sub-channel by the control component, wherein the third shared authentication key is generated using the shared third secret and the sixth random value;

generating a fourth authentication token by the control component using the third authentication key and the third ephemeral public cryptographic key of the personalization server to authenticate the ID application program to the personalization server;

sending the sixth random value together with the fourth authentication token for authenticating the ID application program by the control component to the personalization server via the first encrypted communication channel.

15. Method according to claim 1, wherein the method further comprises using the cryptographically secured electronic identity, wherein one or more of the contributed attributes are provided to an ID provider server, wherein the using comprises:

establishing a second encrypted communication channel between the mobile device and the ID provider server over the network;

receiving a read request from an ID provider server to read one or more of the attributes of the electronic identity;

authenticating the ID provider server by the ID application program using the control component;

authenticating the ID application program to the ID provider server by the security element using the control component;

reading out the attributes to be read from the mobile device by the ID provider server via the network using the control component.

16. Method according to claim 15, wherein authenticating the ID provider server using the control component comprises:

sending a challenge from the control component to the ID provider server via the second encrypted communication channel;

receiving a response from the ID provider server by the control component, wherein the response is a signature of the challenge created using the private cryptographic key of an asymmetric key pair of the ID provider server;

receiving a fourth ephemeral public cryptographic key of an ephemeral key pair of the ID provider server by the control component;

verifying the received response using a public cryptographic key of the asymmetric key pair of the ID provider server and the sent challenge;

storing the fourth ephemeral public cryptographic key of the ID provider server by the control component on the mobile device.

17. Method according to claim 15, wherein authenticating the ID application program to the ID provider server by the security element using the control component comprises:

sending a request to generate a fourth secret shared with the ID provider server from the control component to the security element, the request comprising a fourth ephemeral public cryptographic key of the ID provider server;

in response to the request, receiving by the control component the shared fourth secret generated by the security element, wherein the generation of the shared fourth secret by the security element is performed using the first private cryptographic key of the ID application program and the fourth ephemeral public cryptographic key of the ID provider server;

generating a tenth random value by the control component;

generating a fourth shared authentication key for authenticating data to the ID provider server by the control component, wherein the fourth shared authentication key is generated using the shared fourth secret and the tenth random value;

generating a fifth authentication token by the control component using the fourth authentication key and the fourth ephemeral public cryptographic key of the ID provider server to authenticate the ID application program to the ID provider server;

sending the tenth random value together with the fifth authentication token for authenticating the ID application program by the control component to the ID provider server via the second encrypted communication channel.

18. Mobile device, the mobile device comprising a processor and a memory, the memory storing an identification (ID) application program for providing an electronic identity, wherein the processor is configured to execute a method for creating a cryptographically secured electronic identity of a user on a mobile device, wherein the ID application program on the mobile device is personalized using an ID token, wherein the ID application program comprises a control component for controlling the creation of the electronic identity, the ID application program further comprising a provisioning component for executing provisioning of the ID application program in the course of creating the cryptographically secured electronic identity, wherein the ID application program further comprises a personalization component for personalizing the ID application program, wherein the mobile device further comprises a security element, wherein the mobile device further comprises a communication interface for communicating via a network with a personalization server;

wherein provisioning the ID application program comprises:

in response to a security inspection request from the provisioning component;

performing a remote security inspection of the security infrastructure of the mobile device using the control component by a personalization server over a network;

receiving a result of the remote security inspection of the personalization server, which the control component forwards to the provisioning component;

in response to a positive result of the remote security inspection, sending a key generation request from the provisioning component to the control component, which the control component forwards to the security element;

in response to the key generation request, generating by the security element a first asymmetric key pair associated with the ID application program and a second asymmetric key pair associated with the ID application program, the first asymmetric key pair comprising a first private cryptographic key and a first public cryptographic key wherein the second asymmetric key pair comprises a second private cryptographic key and a second public cryptographic key, wherein the security element sends the first and second public cryptographic keys to the control component, which forwards the two public cryptographic keys to the provisioning component;

upon receipt of the two public cryptographic keys, generating a certificate request by the provisioning component for generating a certificate of the ID application program comprising the first public cryptographic key, wherein the certificate request comprises the first public cryptographic key;

sending the certificate request by the provisioning component over the network to the personalization server, the certificate request comprising the first public cryptographic key, wherein the provisioning component sends the second public cryptographic key to the personalization server in addition to the certificate request;

in response to the certificate request, receiving the certificate generated by the personalization server with the first public cryptographic key and a root certificate of a root instance of a PKI, storing the certificate of the ID application program and the root certificate on the mobile device; and wherein the personalizing comprises:

establishing a first encrypted communication channel between the mobile device and the personalization server over the network, wherein the personalization component is used to establish the first encrypted communication channel;

establishing a first encrypted sub-channel between the ID token and the personalization server within the first encrypted communication channel via the mobile device, wherein the personalization component is used to establish the first encrypted sub-channel;

reading one or more of the attributes from the ID token by the personalization server via the first encrypted sub-channel within the first encrypted communication channel;

establishing a second encrypted sub-channel between the control component and the personalization server within the first encrypted communication channel, wherein the personalization component is used to establish the second encrypted sub-channel;

receiving the read attributes by the control component from the personalization server via the second encrypted sub-channel within the first encrypted communication channel;

storing the received attributes by the control component on the mobile device, wherein the ID application program is configured to use the attributes to prove an identity of the user to another computer system.

19. System, the system comprising a mobile device according to claim 18 and a personalization server, wherein the personalization server is configured to perform a remote security inspection of the security infrastructure of the mobile device via the network, to receive the certificate request with the first public cryptographic key generated by the security element of the mobile device, for receiving the second public cryptographic key generated by the security element of the mobile device, for creating a certificate with the first public cryptographic key, for providing a root certificate of a root instance of a PKI, and for reading attributes from an ID token via the mobile device and for personalizing the ID application program of the mobile device.

* * * * *